Figure 1:
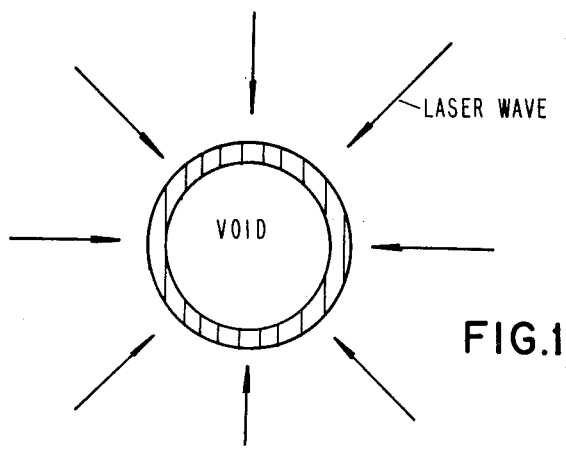

United States Patent [19]

Brueckner

[11] Patent Number: 4,608,222
[45] Date of Patent: Aug. 26, 1986

[54] METHOD OF ACHIEVING THE CONTROLLED RELEASE OF THERMONUCLEAR ENERGY

[75] Inventor: Keith A. Brueckner, Ann Arbor, Mich.

[73] Assignee: KMS Fusion, Inc., Ann Arbor, Mich.

[21] Appl. No.: 377,508

[22] Filed: Jul. 10, 1973

Related U.S. Application Data

[63] Continuation-in-part of Ser. No. 116,707, Jan. 29, 1971, abandoned, which is a continuation-in-part of Ser. No. 65,754, Jul. 13, 1970, abandoned, which is a continuation-in-part of Ser. No. 866,778, Oct. 15, 1969, abandoned.

[51] Int. Cl.$^4$ .............................................. G21B 1/00
[52] U.S. Cl. .................................... 376/104; 376/103; 376/152
[58] Field of Search .................. 176/1, 3, 9; 376/104, 376/103, 152

[56] References Cited

U.S. PATENT DOCUMENTS

| | | | |
|---|---|---|---|
| 3,047,480 | 7/1962 | Louberg | 176/1 |
| 3,378,446 | 4/1968 | Whittlesey | 176/1 |
| 3,489,645 | 1/1970 | Daiber | 176/1 |

OTHER PUBLICATIONS

Fortune, Dec. 1974, pp. 149–152, 154, 156.
UCRL-77056, 10/75, pp. 6, 7, 13, 14, FIG. 7.
Science News 7/77, pp. 21–22.
1954 U.S. Code Congressional and Administrative News, pp. 3466, 3467, 3480, 3532.
Legislative History of the Atomic Energy Act of 1954, vol. II, pp. 1759, 2305, 2373, 2374.
New York Times, Jan. 30, 1973, p. 21.
Nuclear News 3/78, pp. 30–35.
FTD-HT-66-422, 3/67, by Chao et al., pp. 1–9.
Nature, vol. 258, 12/75, pp. 512–514.
National Defense, May–Jun. 1978, pp. 538–543, 580–582, 584.
Legistative Histroy of the Atomic Energy Act of 1954, vol. III, pp. 2849, 2859.
Nuclear Fusion, vol. 10, 1970, by Linhart, pp. 211, 212, 222, 225, 226.
Popular Science 12/76, pp. 66–71, 148, 150.
Laser Focus 5/77, p. 6.
UCRL-5002-75, Mar. 1976, p. 25.
Nuclear News, 5/75, pp. 79, 80.
"Exploding reactors for Power" Marwick, 1/73, pp. 17–19, 26–28, 38.
Science, vol. 188, 4/75, pp. 30–34.
ERDA-28, 1/75, pp. 1–3, 8–10.

*Primary Examiner*—Harvey E. Behrend
*Attorney, Agent, or Firm*—Barnes, Kisselle, Raisch, Choate, Whittemore & Hulbert

[57] ABSTRACT

A method of achieving the controlled release of thermonuclear energy by illuminating a minute, solid density, hollow shell of a mixture of material such as deuterium and tritium with a high intensity, uniformly converging laser wave to effect an extremely rapid build-up of energy in inwardly traveling shock waves to implode the shell creating thermonuclear conditions causing a reaction of deuterons and tritons and a resultant high energy thermonuclear burn. Utilizing the resulting energy as a thermal source and to breed tritium or plutonium. The invention also contemplates a laser source wherein the flux level is increased with time to reduce the initial shock heating of fuel and provide maximum compression after implosion; and, in addition, computations and an equation are provided to enable the selection of a design having a high degree of stability and a dependable fusion performance by establishing a proper relationship between the laser energy input and the size and character of the selected material for the fusion capsule.

37 Claims, 9 Drawing Figures

START OF IMPLOSION

IMPLOSION NEARLY COMPLETE

LEGEND
SOLID
HIGH PRESSURE PLASMA

IMPLOSION COMPLETE

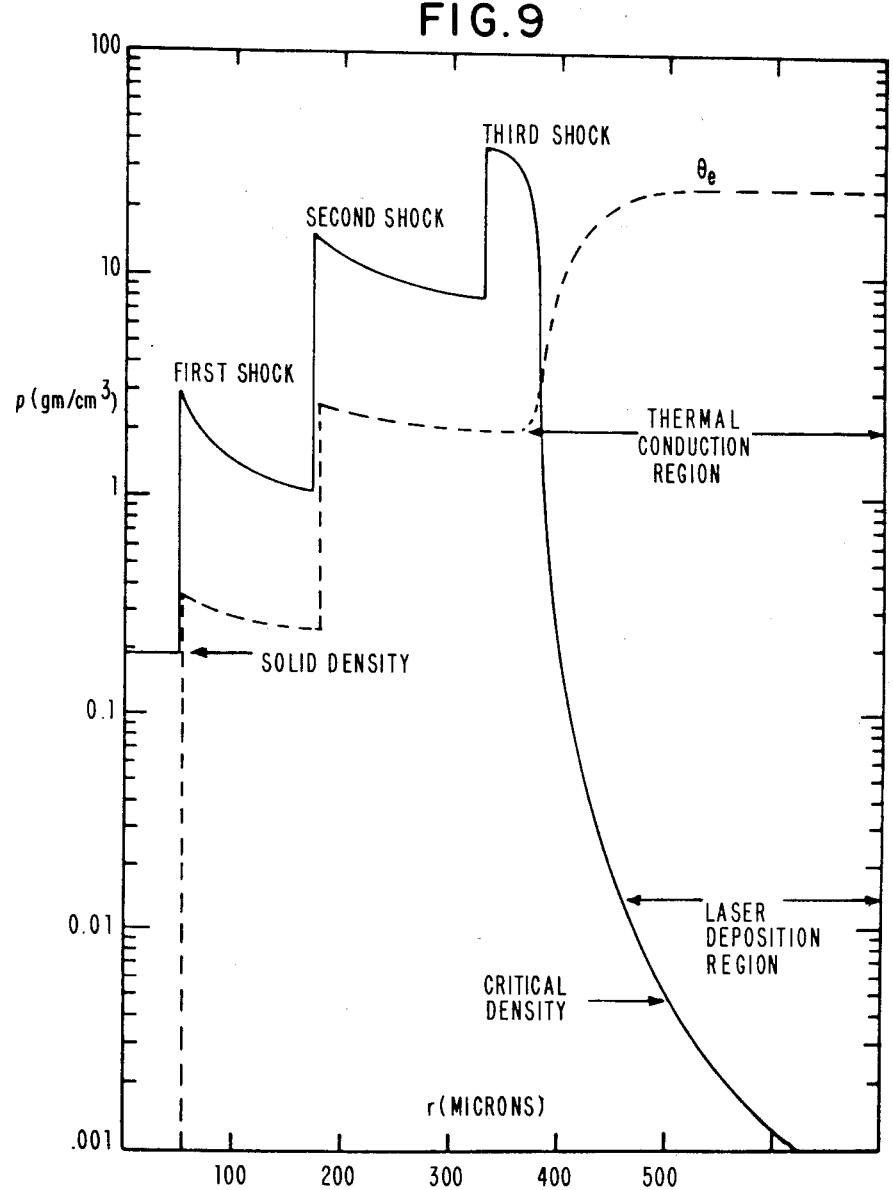

METHOD OF ACHIEVING THE CONTROLLED RELEASE OF THERMONUCLEAR ENERGY

This application is a continuation-in-part of my copending application entitled "Method of Achieving the Controlled Release of Thermonuclear Energy," Ser. No. 116,707, filed Jan. 29, 1971 (now abandoned), which in turn was a continuation-in-part of my application, Ser. No. 65,754, filed July 13, 1970 (now abandoned), which was in turn a continuation-in-part of my application, Ser. No. 866,778, filed Oct. 15, 1969 (now abandoned).

Reference is also made to my copending applications, Ser. No. 371,385, filed June 21, 1973, which is a continuation-in-part of my application, Ser. No. 12,625, filed Feb. 20, 1970 (now abandoned), which in turn was a continuation-in-part of my application, Ser. No. 4,495, filed Dec. 19, 1969 (now abandoned), and to Ser. No. 337,094, filed Mar. 2, 1973, which was a continuation-in-part of Ser. No. 12,624, filed Feb. 20, 1970 (now abandoned), which in turn was a continuation-in-part of my application, Ser. No. 4,497, filed Dec. 19, 1969 (now abandoned).

This invention relates to a Method of Achieving the Controlled Release of Thermonuclear Energy.

It is an object of the invention to provide a method of releasing thermonuclear energy which is clean in the sense that there is no dangerous fall-out contamination, that is, the the reaction products are much less hazardous than fusion reactor products and which essentially eliminates uncontrolled or "run-away" hazards of the presently operating nuclear reactors.

It is a further object to provide a reactor system which utilizes a relatively cheap fuel and one which breeds one or more of the products from which it proceeds.

It is a further object to provide a reactor system which produces an energy output which is much greater than the energy input utilized for triggering.

It is a further object to provide a system for use in the controlled release of thermonuclear energy which is sufficiently simple, compact and manageable from a weight factor, that it may be used for small or large power plants.

Other objects and features of the invention will be apparent in the following description and claims in which the principles of operation are disclosed together with utility in connection with the best mode of the invention presently contemplated.

DRAWINGS accompany the disclosure and the various views thereof may be briefly described as:

FIGS. 1 to 4, consecutive stages in the implosion process of the deuterium-tritium fuel shell.

Figures 5, 7:
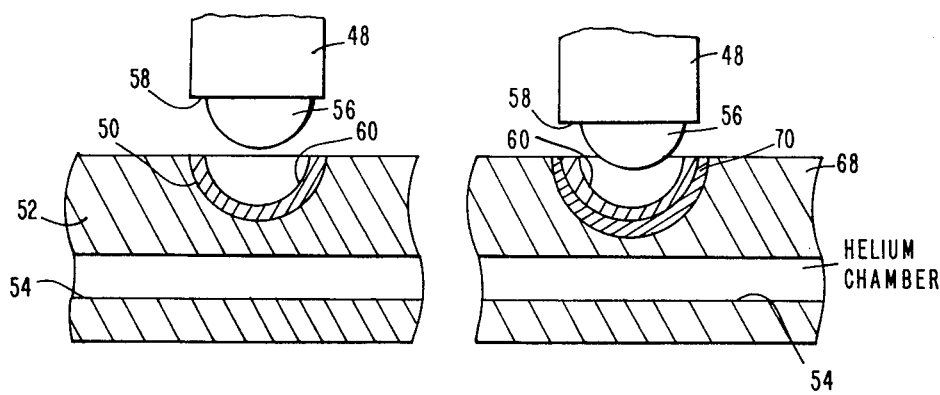

FIG. 5, an enlarged view of a mold for use in forming hemispherical pellets.

Figure 6:
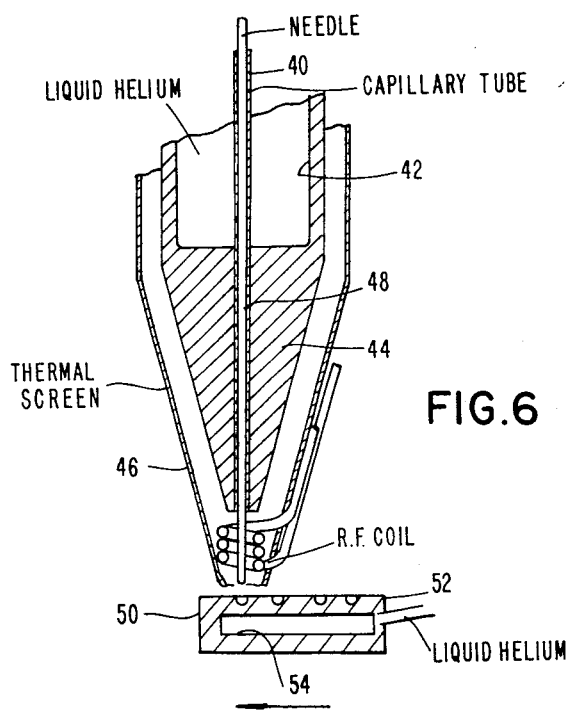

FIG. 6, a view of an apparatus for forming hemispherical pellets.

FIG. 7, a modified view of a mold utilizing a composite pellet configuration with an outer shell of one material and an inner shell of fusion fuel.

Figure 8:
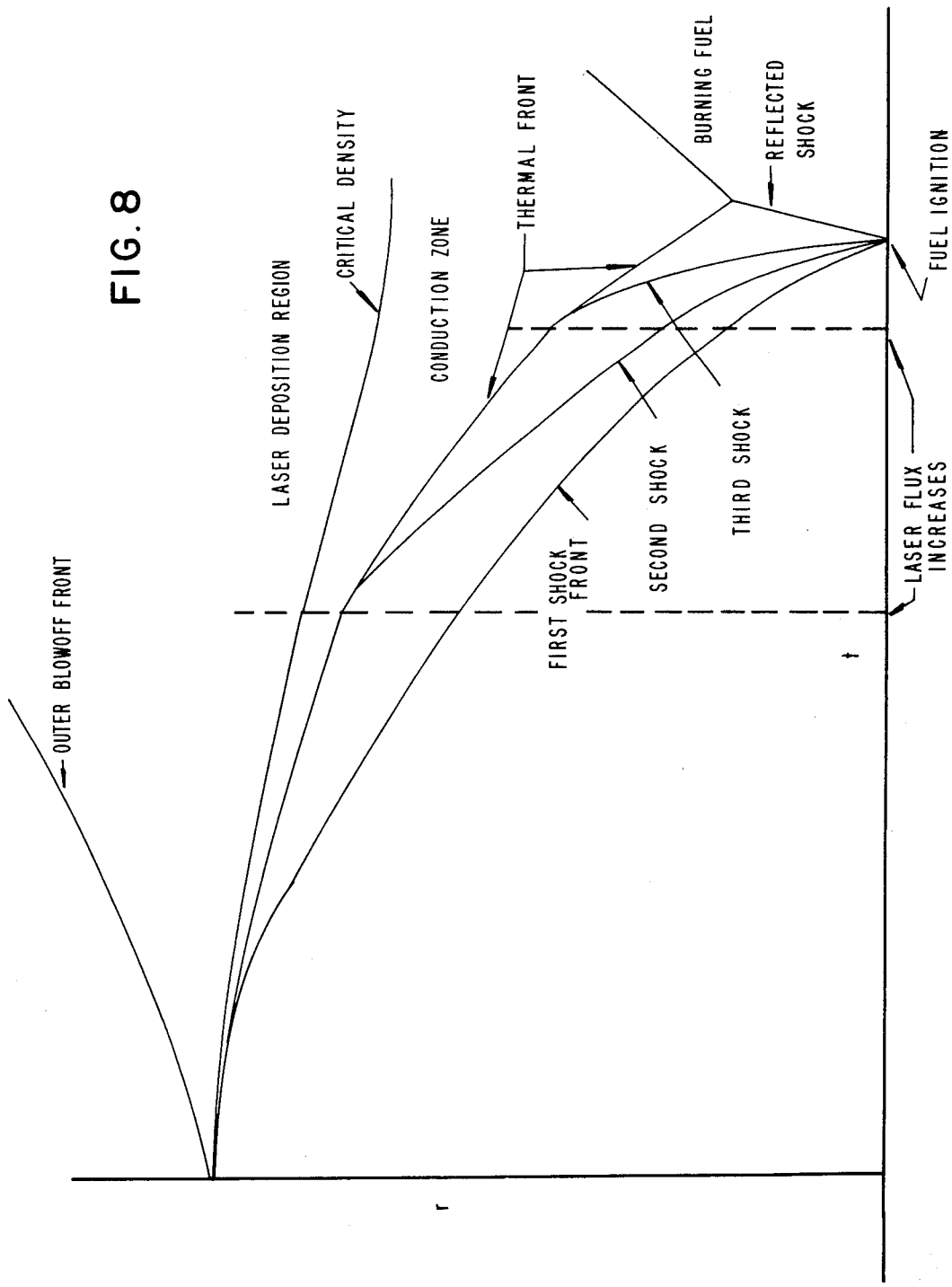

FIG. 8, a diagram plodding radius against time illustrating radius of the different fronts as a function of time up to the point of maximum fuel compression and subsequent fuel ignition and burn.

FIG. 9, a diagram showing typical density and temperature profiles during implosion.

The method to be disclosed for controlled release of thermonuclear energy contemplates a unique form of fuel, namely, a hollow shell, preferably, but not necessarily, spherically formed of an equal mixture of deuterium and tritium. The basic fuel shells are formed of the equal mixture of deuterium and tritium at solid density ($3 \times 10^{22}$ atoms/cm$^3$) by forming, under cryogenic conditions, semi-spherical bodies at about 5° to 10° Kelvin and welding these bodies into spherical shells at about 21° Kelvin. Tritium is mildly radioactive but normal precautions make the forming process one of comparative simplicity.

The term "sphere" as used herein is intended to mean a shape without openings formed of a solid density material, the shape being such as to match the laser flux distribution in space and time as will be described. While the use of a hollow shape or shell will be described as most desirable, it is possible to utilize a solid shape, i.e., without void, giving a thermonuclear reaction of lower efficiency.

The shell, which has been indicated as preferably spherical, preferably has an outer radius in the range of 0.01 to 0.10 cm with a shell thickness in the range of 5 to 30% of the outer radius.

These shells form the so-called "fuel" for the process which contemplates an imploding action resulting from irradiation of the hollow shells by a converging laser wave of a predetermined pulse shape and duration to create density and temperature conditions to effect thermonuclear ignition of the central regions of the imploded shell.

The laser capacity contemplated for the process ranges from 10,000 to 100,000 joules. Single lasers have been built for producing several kilojoules. A feasible laser source for the present system presently lies in a multiplicity of laser sources to create a converging laser beam in phase in time with a common master oscillator. This laser system should be appropriately shielded from the reaction if used directly, but it is contemplated that the laser beam may be directed to mirrors which focus the beam at a spot in the confines of a reaction volume within the reactor body. The latter system may be preferable even though the mirrors must be replaced occasionally. Magnetic shielding can also be used to protect the mirrors from the charged particle flux.

The reactor body will enclose the laser source, the mirrors, the support or introduction area for the shell of deuterium-tritium material, and a lithium coolant system for absorbing the heat of reaction.

The mirrors can be arranged in space around a focal point in such a way that the laser energy is brought to bear on the deuterium-tritium shell at a plurality of points around its surface. The number of mirrors and consequent areas or directions of laser energy input can be determined by calculation. The probable non-uniformity in laser flux can be compensated for in the geometry of the hollow shell to maintain the maximum convergence in the implosion. In other words, the shell of deuterium and tritium (D-T shell) may be formed with a configuration matched to the shape of the converging laser wave.

The triggering of the laser can be accomplished manually by placing a prepared shell at a predetermined focal point of the lasers and effecting the laser pulse as desired. It also can be accomplished by dropping the prepared shell through the focal point of the laser to trigger automatically the laser pulse in the precise timing desired.

The laser pulse can be very short in the nature of one thousandth millionth of a second. The process is believed to proceed as described below when the laser beam strikes the above described fuel shell.

1. The laser energy is absorbed by inverse bremsstrahlung at the D-T surface as a result of the finite surface density gradient and of the penetration of the evanescent wave into the solid, to cause ionization and a rapid rise in pressure at the surface, with a layer of heated D-T plasma forming at the surface.

2. The pressure in the D-T plasma, for a laser flux of $10^{20}$ to $10^{21}$ erg/cm² sec, rises in a fraction of $10^{-9}$ seconds to several megabar pressure, causing a shock wave to pass into the solid shell and accelerate the shell toward the sphere center.

3. The penetration of the laser wave into the solid shell and the continued formation of the high pressure plasma layer are the result of very rapid heat conduction by electron-electron collisions which cause a diffuse gradient of density at the laser wave front, allowing absorption in the under dense plasma.

4. The electron temperature is considerably higher than the ion temperature because of slow collisional energy transfer from electrons to ions; the hydrodynamic motion is therefore primarily the result of electron pressure.

5. The continued laser—produced high plasma pressure maintains the inward acceleration of the D-T shell, which loses material from the surface blow-off but increases in thickness as a result of spherical convergence.

6. The inner surface of the D-T shell reaches the center moving at a velocity of 1 to $3 \times 10^8$ cm/sec, depending on laser reflux, and at a density above the initial solid density, provided that the initial shock is not too strong and does not excessively heat the shell. After the implosion reaches the center, the reflected shock causes further heating and compression, producing thermonuclear conditions.

7. The rapid rise in central temperature from the D-T reaction, with the α-particles being locally deposited and the 14-mev neutrons escaping, sends out a secondary shock wave which further heats the regions surrounding the center. The region of a substantial fraction of thermonuclear burn is of the order of a few percent of the initial volume.

One example supported by computation is as follows:

| | |
|---|---|
| Outer radius of fuel shell | 0.10 cm |
| Inner radius | 0.0836 cm |
| Laser flux at outer surface | $6.25 \times 10^{19}$ erg/sterradian-sec |
| Pulse length | $10^{-9}$ seconds |
| Total laser energy | $7.84 \times 10^{11}$ erg |
| Laser energy absorbed | $2.36 \times 10^{11}$ erg |

This produces a thermonuclear yield of $1.95 \times 10^{13}$ erg and a total number of $7.6 \times 10^{17}$ 14 mev (million electron volts) neutrons. These results are correct to an order-of-magnitude and can be refined by further analysis. The laser-produced D-T ignition releases thermonuclear energy in a time scale of a few times $10^{-10}$ seconds.

It has been noted above that the fuel pellet may be made by the forming of deuterium and tritium at solid density into semi-spherical bodies, that is, forming hemispheres under cryogenic conditions at about 5° to 10° Kelvin and welding these hemispheres into a spherical shell at about 21° Kelvin.

It will be apparent to those skilled in working with microdimensions that the hollow spherical structures illustrated in the drawings can readily be formed. The fuel configurations may involve, for example, the use of beryllium, which is solid at room temperatures and can be shaped or applied even though in small dimensions. Evidence of ability of artisans to work in small dimensions, i.e., millimeters or fractions thereof, is found in "The Manufacture of Microchannel Electron Multiplier Arrays", first described in IRE Transactions on Nuclear Science, Vol. NS-9, No. 3, June 1962. Larger numbers of glass tubes having an outside diameter of a hundred micrometers and an inside diameter of fifty micrometers, each having an inner resistive coating, are compacted into an assembly for use in electron multipliers.

For the benefit of those who may not be skilled in the art of working in these dimensions, the following information may be of assistance. Several disclosures in the June of 1969 at Rensselaer Polytechnic Institute (Laser Interaction and Related Plasma Phenomenon, Plenum Press, New York—London 1971) illustrate the manner in which deuterium-tritium (solid hydrogen pellets) can be made by introducing hydrogen gas into a pipe cooled by liquid helium. See G. Francis et al Phys. Lett. 25A, 486 (1967); Ceccini, DeAngelis, Gratton, Lab. Pep Frascati L.G.I. 68/8 (1968). The solid material may be shaped in a mold as a semi-spherical body and then a sphere may be formed by placing the edges of two hemispheres in registry and slightly raising the temperature to cause welding or regelation, i.e., freezing together to form a solid sphere. A rise from the area of 5° to 10° Kelvin to a range of 21° Kelvin will readily effect this welding of the hemispheres.

FIG. 5 illustrates a mold wherein the above configuration can be formed. In FIG. 6, a capillary tube 40 passes through a liquid helium chamber 42 in a nozzle head 44 surrounded by a thermal screen 46. A ram needle 48 is designed to have a slip fit inside the tube 40 which may have a diameter in the range of 1 to 2 millimeters depending on the desired size of the pellet. Hydrogen gas of suitable composition is filled into the tube 40 with the lower end closed by a suitable movable stopper. The gas solidifies in the form of frost on the walls of the tube and the solid deuterium-tritium is removed from the walls, after the removal of the stopper, by ramming the needle 48 through the tube. The material is pushed out the end of the tube and into a recess 50 in a mold plate 52 which is cooled by a liquid helium chamber 54. The mold is preferably coated with a parting compound such as Teflon, silicone, or white graphite (pyrolytic boron nitride) to assist in the removal of the hemispheres. The end of the ram needle or plunger 48 is shaped with a hemispherical ball 56 terminating at an annular shoulder 58 in order that the solid deuterium-tritium which is formed from the tube will be formed into a hemisphere 60. The ram needle, heated by radiation or radio frequency, can be used for melting and molding as well as release of the hemisphere from the mold. After a plurality of hemispheres have been formed under cryogenic conditions, they may be readily ejected from the mold by slight heating of the mold area. The ejected hemisphere can be handled manually, if desired, by cryotips charged with static electricity. In this way, two hemispheres are fitted together with micromanipulators and caused to locally weld together (via liquid phase) to form a hollow sphere. The completed spheres are then stored at cryogenic temperatures.

In some instances where a composite configuration is desired, the mold may be lined by a thin hemisphere of beryllium or, perhaps, aluminum. These metals are solid at room temperature and can readily be pressed from a sheet or foil into hemispherical shapes to form a mold for a deuterium-tritium liner, or can be deposited in the mold by chemical plating, vacuum deposition, chemical vapor deposition, or sputtering. If lithium hydride is used, it can be compacted from a powder form. FIG. 7 illustrates such a mold 68 with a liner 70 of beryllium, for example, and a formed hemisphere 60 of solid hydrogen. The joining of the interior hemispheres can be readily accomplished by contact and cold welding as previously described and conjointly or alternatively the outer hemispheres can be joined together by cold welding or electron beam welding to provide the composite structure. See *The Revolution in Materials Joining,* Michael G. Busche, Materials and Design Engineering, Reinhold Publishing Corporation, August 1970; *Thermal Analysis of Laser Drilling,* Park and Gagliano, IEEE Journal of Quantom Electronics, February 1972.

Thus, it will be seen that the disclosed spherical structures can readily be formed by persons skilled in the art of microstructures. The structure of FIG. 1 can be made by utilizing the mold shown in FIGS. 5 and 6 where the composite hemispheres are shaped in a mold and welded together.

Reference is also made to the process of encapsulation which is utilized for the coating of small parts as illustrated in U.S. patents to Sachsel et al No. 3,202,533 (1965) and Grass, Jr. et al No. 3,237,596 (1966).

Another way to obtain a spherical configuration of deuterium-tritium is by filling a glass microsphere of proper diameter with hydrogen gas (deuterium-tritium gas) by diffusion under heat and pressure and then freezing out the gas on the inner walls of the sphere by exposure to cryogenic temperatures to form the hollow shell of fusion fuel. This is described in a copending application of Robert J. Teitel and David E. Solomon, Ser. No. 339,558, filed Mar. 9, 1973, assigned to the assignee of the present application, entitled "Process for the Fabrication of Thermonuclear Fuel Pellets and the Product Thereof."

The term "blow-off" material has been used in reference to a coating outside the fuel shell. This may include materials in a group comprising beryllium, aluminum, boron, silicon dioxide, glass, carbon and polyethylene. A tamper layer may be interposed between the blow-off material and the fuel and may include materials in a group comprising gold, uranium, tungsten, aluminum, beryllium, silicon dioxide, glass, carbon, nickel and copper. As will be seen, some of the above materials will perform dual functions. When separate layers are desirable, different materials are used.

IN THE DRAWINGS, FIGS. 1 to 4 illustrate progressive conditions during the illumination by the laser wave. In FIG. 1, the solid density shell of deuterium-tritium is illustrated with the radially inward arrows diagrammatically representing the laser wave illumination being applied around the surface of the shell.

Figure 2:
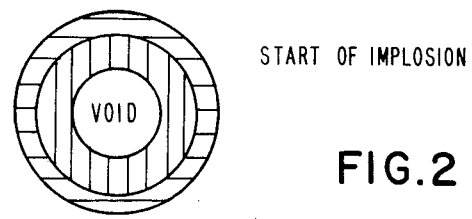

FIG. 2 illustrates the start of the implosion with shock waves moving inwardly through the shell. The high pressure plasma is represented by the outer layer in horizontal line section.

Figure 3:
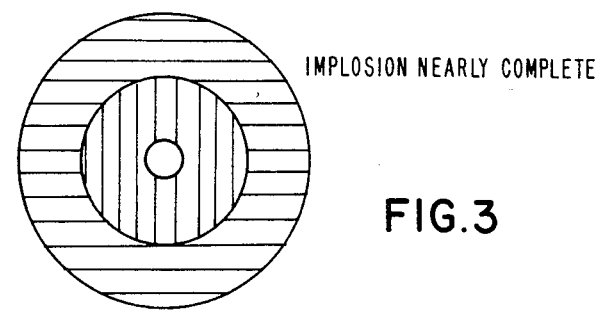

In FIG. 3, the implosion is nearly complete, the plasma layer having increased in thickness but the wall thickness having also increased due to the ensmalling of the shell by the implosion forces.

Figure 4:
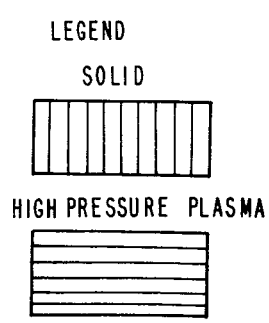
Figure 4:
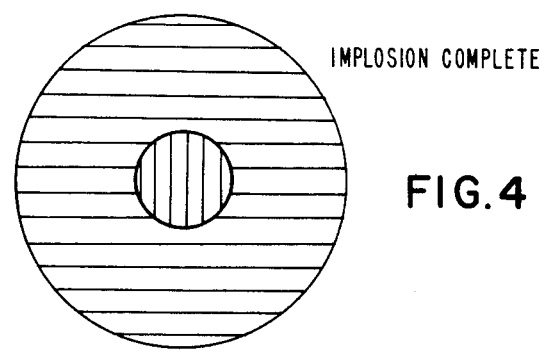

FIG. 4 represents the implosion complete, the center void having disappeared, the thermonuclear reactions starting at the center of implosion (reaction core), the reflected shock giving further density increase.

The thermonuclear burn is, of course, the result of deuterons and tritons reacting. Keeping in mind the above figures for energy release, input laser energy absorbed, and the number of 14-mev neutrons released, it will be appreciated that a single laser pulse with a pulse rate of one per second can therefore produce a thermonuclear power output of 1.94 megawatts. If the laser output efficiency is 5 percent, the power input to the laser is 0.47 megawatts per unit per pulse. Thus, a 500 megawatt thermal reactor would require 10 laser units pulsing at 34 per second repetition rate.

The reaction produces heat from the expanding material which has not been burned. The thermal energy output results from the kinetic energy of the expanding D-T plasma and the charged particle reaction products ($\alpha$-particles and $He^3$), and from the moderation of the 14-mev neutrons from the D-T reaction. The thermal energy can be removed by providing a liquid lithium absorber in the reactor body surrounding or adjacent the reactor volume and flowing the liquid lithium to an external heat exchanger.

Another important result of the controlled burn is the production of fast neutrons which can be multiplied in beryllium and captured in tritium. The result is a tritium breeder wherein one of the actual materials used in the fuel shell can be produced by the reaction. This is accomplished by slowing the fast neutrons in beryllium, to multiply the number of neutrons by the reaction, $n + Be^9 \rightarrow 2\alpha + 2n$, and then by absorbing the neutrons in lithium, $n + Li^6 \rightarrow \alpha + t$ to give tritium. This produces more tritium than is consumed in the reaction and hence the reaction breeds tritium. The system may also be utilized to breed plutonium if this is desired.

The process can be further optimized by (1) shaping the laser pulse to give secondary shocks arriving at the implosion center at time of maximum compression; (2) terminating the laser pulse at the time for which the resulting rarefaction wave reaches the center after energy production is over; (3) using a high Z contaminant such as uranium, thorium, radium, in a shell under the blow-off layer to give a thermal conduction barrier to prevent premature heating of the inner surface of the shell; (4) pre-expanding the D-T surface at low laser flux to give improved laser coupling at high power; and (5) using a shell of high density material such as uranium, tungsten, gold, or in some cases, residual beryllium, aluminum or nickel, under the surface blow-off layer to give increased inertial tamping of the reacting D-T center.

All the thermonuclear yield comes from close to the center of the imploded material so that the outer zones can be hydrogen or deuterium without materially affecting the efficiency. This will reduce the radioactivity and also the amount of tritium required for reactor start-up.

The reactor processed as above described has the following advantages over conventional fission reactors:

1. The energy released by the thermonuclear reaction is much larger than the laser energy input. 2. Deuterium fuel is cheap and inexhaustible.

3. The reactor breeds tritium and hence is self-sustaining.

4. Chemical processing of lithium to remove tritium is much simpler than processing of fissile fuels.

5. The power reactor can be designed in relatively small sizes.

6. The reactor does not present "run-away" hazard.

7. Reaction products are much less hazardous than fission reactor products.

8. The reactor does not produce fissile material for weapon use.

Thus, it would appear that the possibilities of the process for use in heating system and power systems are practically limitless and that capital expenditures for producing power equivalent to presently existing, or planned, water and reactor plants would be substantially lower.

COMPUTATIONAL DETAILS

It is well known in this field of nuclear fusion and fission that computational detail is required in the design of configurations used. Thus, the computer can be used to determine laser power, the shape and pulse of the laser flux, the selection of materials, the thickness and profiles of the various shells to be utilized. Standard treatises on numerical analysis in the nuclear field define the standard features to be used in the computational code and can be obtained from these standard sources; the code must include the following features and, in addition, where choices exist in the code development, the proper choice is indicated.

With respect to laser interaction, the following should be considered:

(1) Absorption by inverse bremsstrahlung (free-free)

$$K_{ff} = 1.98 \times 10^{-23} \frac{z^2 N_e N_i \lambda^{*2} g}{T_e^{3/2}}$$

$$\lambda^* = \frac{\lambda}{(1 - \omega_p^2/\omega^2)^{1/4}}$$

$$\omega_p^2 = \frac{4\pi N_e e^2}{mc^2}$$

$$\omega = \frac{2\pi c}{\lambda}$$

The symbols in the above are:
$K_{ff}$ = free-free absorption coefficient
$z$ = ion charge
$N_e$ = electron number density
$N_i$ = ion number density
$\lambda^* = \lambda/(1 - \omega_p^2/\omega^2)^{\frac{1}{4}}$ and
$\lambda$ = laser wave length
$g$ = Gaunt factor
$T_e$ = electron temperature
$\omega_p$ = electron plasma frequency
$\omega$ = laser frequency
$m$ = electron mass
$c$ = light velocity (2) Integrate flux equation to overdense point at which reflection occurs, neglecting penetration of evanescent wave.

(3) Include thermal conduction by electron-electron collisions, using implicit difference equations in conservation form to maintain energy balance.

(4) Include electron-ion transfer of energy by coulomb collisions.

With respect to the hydrodynamics of motion, the following should be considered and utilized:

(1) Lagrangian coordinate system.

(2) Artificial viscosity to stabilize shocks, included in heavy particle equation only.

(3) Fine zoning or rezoning is needed to handle steep gradients near center of convergence. The number of zones required is in the range of 50-100 for a typical case, providing that 10 to 15 zones are in the fuel and 5 to 10 in the imploded shell.

(4) Assume charge neutrality and treat electrons as massless fluid.

(5) Equation of state for deuterium and tritium can be assumed to be ideal gas of ions and electrons. Improved equation of state for lithium, beryllium is desirable and required for heavier elements.

With respect to radiation, the following must be considered:

(1) Bremsstrahlung losses are negligible in deuterium or tritium but become marginally important in heavier elements. The total loss should be limited to black body to avoid anomalously high loss in certain zones.

(2) Inverse Compton effect leading to cooling of electrons by transfer to the radiation field is unimportant for the small geometries (fractions of a millimeter) and short times ($10^{-9}$ seconds) of the initial implosion. The importance should, however, be examined for the larger geometry of staged devices and for confined initial implosions with channel geometry.

(3) The low energy radiation field from bremsstrahlung gives some energy transport ahead of the thermal and hydrodynamic shock fronts. This can be included as a weak heating effect.

For nuclear reactions, the computations should be based on the following:

(1) The reaction rate depends on the Maxwell average reaction constant $\bar{\rho v}$. This is given incorrectly for D-T in much of the literature, particularly below 10 kev. The value should be recomputed from published reaction cross-section measurements. (2) The energy deposition by the fast charged particles from the D-T or D-D reactions is partitioned between electrons and ions. The results given by Lawrence Radiation Laboratories, Livermore, Calif., are incorrect, particularly for the D-D reaction, and should be recalculated from the well-known coulomb cross-section results.

(3) The energy and momentum transport by fast charged particles should be calculated as a function of electron and ion temperatures and density, including the dependence on the material atomic and mass number. The increase in range with rise in electron temperature is particularly important.

(4) The depletion of the fuel is accompanied by mass transport from the fuel, the neutrons escaping initially and the charged particles escaping after the fuel temperature has risen. This is taken into account, along with the energy and momentum transport, in the mass and energy content of the fuel gases.

(5) During the ignition phase, when the temperature is rising rapidly, the time steps of the integration should be reduced to minimize errors in the energy integration.

DESIGN DETAILS

Important details of the physical design and phenomena, which aid in the understanding of the structures and process, are presented in the following sections.

A. LASER INTERACTION (1) For a given material, the laser pulse front rise should be adjusted to minimize high reflection loss as density gradient forms at high density surface.

(2) The density profile in the surface layer should be preformed to improve the early laser coupling. A shallow layer initially at critical density improves performance.

(3) The material atomic number and mass number should be selected to give maximum coupling at desired temperature and pressure, and to reduce blow-off flux. As example, for a radius of one millimeter for an unconfined surface, the laser coupling efficiencies are 30 percent for solid deuterium and 70 percent for beryllium for a laser flux $\phi$ (one micron wavelength) of $1.625 \times 10^{21}$ erg/cm$^2$ sec. The corresponding electron temperatures are approximately 1.5 kev for deuterium and 2.6 kev for beryllium. For higher flux, the temperature increases approximately as $\phi^{\frac{1}{3}}$. Several computer results are given in Table I showing computed plasma conditions from converging laser flux on one millimeter shell. The values are taken at about 1 nanosecond after laser turn-on, before appreciable shell motion has occurred. The flux $\phi$ is given in units of $1.625 \times 10^{23}$ erg/cm$^2$sec, the electron temperature $T_e$ in kilovolts, the pressure p in megabars, and the mass removal rate m in $10^5$ gm/cm$^2$ sec.

TABLE I
Computed Plasma Conditions from Converging Laser Flux on One Millimeter Shell

| Material | $\phi$ | p | $T_e$ | m | 1.625 p$^2$/m$\phi$ |
|---|---|---|---|---|---|
| Li$^6$ | ¼ | 4.02 | 1.39 | 1.40 | 46.1 |
| (⅔ normal | 1 | 12.6 | 2.02 | 2.56 | 62.9 |
| density) | 4 | 29.3 | 3.04 | 5.39 | 39.9 |
|  | 16 | 42.8 | 4.54 | 9.88 | 10.6 |
| Li$^7$ | ¼ | 4.14 | 1.63 | 2.06 | 33.3 |
| (solid) | 1 | 12.5 | 2.36 | 3.83 | 40.9 |
|  | 4 | 33.0 | 3.05 | 5.80 | 47.1 |
| H | 4 | 13.1 | 1.96 | 2.28 | 18.2 |
| D—T | 4 | 28.5 | 1.99 | 5.29 | 38.4 |
| Be | ¼ | 4.42 | 1.62 | 1.47 | 53.3 |
|  | 1 | 12.9 | 2.58 | 3.68 | 45.1 |
|  | 4 | 32.8 | 4.11 | 6.90 | 36.4 |

B. IMPLOSION (1) The pressure produced by the laser energy deposition and the conduction into the dense material is a rapidly varying function of incident flux. The quantity to optimize for maximum energy transfer into the imploded shell, not including the energy of the blow-off layer may be shown to be p$^2$/$\phi$m with p=maximum pressure in imploding shell, and m the mass blow-off rate per unit area at the thermal point. This quantity varies only slowly with material and flux. For a one millimeter sphere, the maximum value occurs at a flux close to $1.625 \times 10^{21}$ erg/cm$^2$ sec. The corresponding peak pressure driving the implosion is in the range of 10 megabars in deuterium to 50 megabars in beryllium. Computed values are given in Table I.

(2) The maximum energy transfer into the implosion occurs only for properly selected shell thickness, which is a function of flux and material. The mass ratio of initial shell mass to imploded mass is optimally in the range of 5 to 10. The ratio can be determined for a given flux level by varying the shell thickness to give a maximum implosion energy. Under the optimum coupling conditions, approximately 10 percent of the laser energy goes into the implosion of the shell which converges centrally and provides the fuel compression and heating.

(3) The initial shock in the imploded shell depends on the rise of the pressure which in turn is determined by the variation of early laser coupling and the density profile. These are adjusted to control the rate of rise of pressure and hence the degree of first shock heating of the shell. The shock heating in the fusion fuel (DT, D, Li$^6$D, or Li$^6$DT) is also affected by the density discontinuity between the shell material and the fuel. A large density change will reflect the initial pressure pulse and reduce the fuel shock heating. These parameters are adjusted to determine the density and temperature in the fuel early in the implosion and hence the initial conditions of temperature and density at which the final fuel compression starts. As an example, for a beryllium shell driving D-T fuel with about 10 percent of the shell mass, the maximum density reached in the fuel is about $5 \times 10^{25}$/cm$^3$ at a temperature of 5 to 10 kev.

C. IGNITION (1) Ignition occurs if the fuel generates energy rapidly enough to rise in temperature to 15–20 kev before disassembly has started. At this temperature, the reaction rate is very high and rapid further heating occurs. The ignition condition depends on the initial temperature, $\theta$ initial, the density n, and the time $\Delta t$ during which the compression is near its peak value. The condition may be written:

$$n\Delta t = f(\theta_{initial})$$

Computed values for DT are:

| $\Theta$initial | (n$\Delta$t)$_{DT}$ |
|---|---|
| 2 kev | 39.1 $\times 10^{14}$ sec/cm$^3$ |
| 3 | 16.0 |
| 4 | 8.75 |
| 5 | 5.57 |
| 6 | 3.91 |
| 7 | 2.92 |
| 8 | 2.26 |
| 9 | 1.80 |
| 10 | 1.46 |

The DD values are approximately 25 times higher.

(2) The energy required to produce ignition is reduced if the ignition occurs at low temperature. The increased value of n$\Delta$t required is achieved by increased compression or by increased inertia in the imploded shell to delay the disassembly.

(3) To give maximum inertial tamping to the fuel, the mass of the tamping shell driven by the implosion should be considerably greater than the fuel mass. The shell density should also be as high as possible to reduce the work done in shell compression as the shell decelerates and transfers energy to the fuel. As an example, a shell of beryllium with mass ten times the fuel mass transfers over half of its kinetic energy into fuel compression. A shell of higher density, such as gold, tungsten or uranium material transfers more efficiently.

(4) The maximum implosion and ignition efficiency for a given kinetic energy of implosion is maximized if (a) a blow-off layer of LiH, Be, or other low-Z element is used to absorb the laser energy and produce the blow-off impulse; (b) a high density layer, such as Au, W, or U, is accelerated to carry the kinetic energy of implosion; (c) the imploded shell-to-fuel mass ratio is of the order of ten. The optimum conditions can be determined by a study of parameter variation, using the computer code. The variables are the material choice and shell thicknesses. The combination of Be or LiH for the outer shell and Au, W, or U for the imploded shell is close to an otpimum choice. The uranium which is preferable is $U_{238}$, since it undergoes fission by fast neutrons.

D. FUEL BURN (1) The internal heating of the reacting fuel is due to the deposition of the charged particle reaction products. At 5 kev electron temperature, as an example, the $\alpha$-particles from the D-T reaction (3.6 Mev) have a range of $3 \times 10^{22}/N_e$. At an electron density of $10^{25}/cm^3$, the range is 30 microns. Thus, if the heated fuel region is considerably larger, the $\alpha$'s (alpha particle) may be assumed to deposit their energy locally. The range increases initially as (electron temperature)$^{3/2}$ until the ions provide the dominant energy loss for the $\alpha$'s, after which the range is weakly dependent on ion or electron temperature. The increase in $\alpha$ range at 30 kev electron temperature is about a factor of ten over the range at 5 kev. Thus, as the fuel ignites and heats to about 20 kev, the fuel becomes relatively transparent to the $\alpha$'s and the heating rate is markedly reduced. This reduces the pressure and hence the fuel disassembly rate.

(2) The $\alpha$-particle flux escaping the fuel carries most of the reaction energy. As the $\alpha$'s enter the colder dense material of the imploded shell, a very rapid rise in pressure occurs in the shell material. This causes a very strong converging shock moving into the fuel and at the same time starts more rapid outward acceleration of the shell. The converging shock in the fuel increases the reaction rate; the increased escaping of $\alpha$-flux reaching the inner transfer surface increases the strength of the converging shock in the fuel. This process is terminated by the rising density in the fuel which again becomes opaque to the internally generated $\alpha$-particles after a compression of about a factor of 30. The rate of pressure build-up is also reduced by the outward acceleration of the external region of the shell which finally reduces the internal pressure in the shell driving the shock into the fuel.

(3) The escape of the $\alpha$-particle flux reduces local heating unless the dimensions of the fuel are sufficiently large. For example, a density of $10^{24}/cm^3$ and a temperature of 5 kev, for example, the $\alpha$'s range is 0.3 millimeters requiring a corresponding fuel radius for efficient heating.

(4) For a fuel density of $1.4 \times 10^{25}/cm^3$ at 5 key ignition temperature and a radius at ignition of 74 microns, the recompression by the $\alpha$-particle heated shell markedly increases the fuel burn. This phase must, therefore, be calculated with precision, particularly the transport of energy by the $\alpha$'s.

(5) The charged particle reaction products are initially stopped in the fuel before the electron temperature has risen. The neutrons are lost, unless the fuel reaches very high density in the recompression phase after ignition. After reaction and heating of the fuel to 20–30 kev, the charged particles are also lost, depositing in the high density shell. Thus, the reaction products are removed from the fuel and do not dilute the fuel. The loss of particles, including the electrons which move with the ions to maintain charge neutrality, drops the pressure in the fuel. The effect of the depletion is, therefore, to reduce the pressure which rises much less rapidly than would result from compression of the undepleted fuel. The fuel, therefore, burns with high efficiency after ignition has occurred and the $\alpha$-particle driven implosion has started, with complete burn-up usually resulting.

The effect may be estimated for D-T using a simple model. If the fuel is transparent to the charged particles and neutrons, the effect on pressure p of compression from the radius $r_o$ to the radius r is $p(r)=p_o(r_o/r)^5$. If the depletion effect is included, the number of ions in the volume $v(r)$ with radius r is reduced at the rate ($\overline{\sigma v}$ is the reaction rate, $n(r)$ the ion number density)

$$\frac{d}{dt}[n(r)V(r)] = -\frac{\overline{\sigma v}\, n(r)^2 V(r)}{2}$$

This equation may be integrated to give $$n(r) = \frac{n_o \left(\frac{r_o}{r}\right)^3}{1 + \frac{1}{2}\int_{t_o}^{t} n_o \overline{\sigma v}\, dt \left(\frac{r_o}{r}\right)^3 dt}$$

If the compression is assumed to occur at a constant velocity, $v_{imp}$, and the slow variation of the reaction rate $\overline{\sigma v}$ is ignored, the integral is $$\int_{t_o}^{t} dt \left(\frac{r_o}{r}\right)^3 = \frac{r_o}{v_{imp}} \left(\frac{r_o^2}{r^2} - 1\right)$$

The temperature rise is $\theta(r)=\theta_o(r_o/r)^2$. Thus, the pressure rise is $$p(r) = \frac{p(r_o)\left(\frac{r_o}{r}\right)^5}{1 + \frac{n_o r_o \overline{\sigma v}}{4 v_{imp}}\left[\left(\frac{r_o}{r}\right)^2 - 1\right]}$$

The internal energy $U(r)$ in the fuel is $$W(r) = \frac{3}{2}V(r)p(r)$$

$$= U(r_o) \frac{\left(\frac{r_o}{r}\right)^2}{1 + \frac{n_o r_o \overline{\sigma v}}{4 v_{imp}}\left[\left(\frac{r_o}{r}\right)^2 - 1\right]}$$

As compression occurs and $r_o/r$ increases, the internal energy changes to $$W(r) = W(r_o)\frac{4v_{imp}}{n_o r_o \overline{\sigma v}}$$

The factor determining the change is less than unity if the velocity causing the implosion is less than $\frac{1}{4} n_o r_o \overline{\sigma v}$.

For typical cases considered, $n_o=3\times 10^{25}/cm^3$, $r_o=5\times 10^{-3}$ cm, $\overline{\sigma v}=10^{-15}$ cm$^3$/sec, giving the condition for $W(r) < W(r_o)$, $v_{imp} < 3.75 \times 10^7$ cm/sec. In these cases, the internal energy drops as the implosion proceeds. If the velocity is higher, the internal energy will rise, but much less rapidly than the energy produced, which is given by ($W\alpha$ is the alpha particle energy)

$$\dot{Y} = [V_o n_o - V(r)n(r)] \frac{W\alpha}{2}$$

$$= Y_o \frac{\left[\frac{n_o \overline{\sigma v}}{4 v_{imp}} \left[\left(\frac{r_o}{r}\right)^2 - 1\right]\right]}{1 + \frac{n_o \overline{\sigma v}}{4 v_{imp}} \left[\left(\frac{r_o}{r}\right)^2 - 1\right]}$$

with the total possible yield given by $$Y_o = V_o n_o W_\alpha / 2$$

The ratio of yield to internal energy is $$\frac{Y(r)}{W(r)} = \frac{Y_o}{W_o} \frac{n_o r_o \overline{\sigma v}}{8 v_{imp}} (1 - r^2/r_o)$$

$$\frac{Y_o}{W_o} = \frac{W_\alpha}{6\theta_o} \simeq 30 \; (\theta_o = 20 \text{ kev})$$

Thus, the $\alpha$ energy produced to drive the implosion is much larger than the internal energy in the fuel, unless the implosion velocity is very high. The increase in pressure for a high implosion velocity reduces the velocity of imploding shell, reducing the rate of pressure build-up. Thus, the implosion tends to adjust to a velocity allowing the implosion to run to completion, with full fuel burn-up.

It has been possible to confirm the concept of the basic disclosure herein by computations carried out on a suitable computer. This resulted in demonstration of the successful ignition and nearly complete burn of D-T in connection with the described technology of fusion pellet fabrication. This has considerable significance in that the thin fuel shells required for the fuel pellet configurations can be fabricated much more easily from LiDT which is a material which can exist in solid form under non-cryogenic conditions. The following material summarizes the computational methods and the principal results obtained.

For the configurations studied in the computations, the successful ignition and burn-up of fuel was found to require high fuel compression at the minimum temperature necessary for ignition to occur. To give the best conditions, the essential variables are the implosion velocity, the tamper-to-fuel mass ratio, the tamper material, and the initial rate of rise of the pressure in the fuel. By tamper material is meant the shell next to the fuel which in general is a high density material such as tungsten, gold, uranium or other metals with similar density and structural properties but under some circumstances may consist of beryllium, aluminum or nickel.

The initial rate of rise of the pressure in the fuel is important since strong initial shocking of the fuel causes excessive heating and prevents high final compression. The pressure rise is controlled by the density of the tamper which affects the shock attenuation into the fuel, and by the rate of the rise of the laser flux.

As indicated above, the shape of the laser pulse may have considerable significance in the efficiency of the burn. If the energy input initially is too high, there is excessive heating of the fuel which prevents a high final compression. On the other hand, a ramped laser input which increases after a certain elapse of time can produce much more efficient results. The examples following set forth show the use of this type of ramped laser flux.

The ignition and efficient burn of D-T thermonuclear fuel requires bringing the fuel to high compression (50–200 grams/cm$^3$) at a temperature of a few kilovolts. This is best accomplished if the fuel is not strongly heated by the initial shock resulting from the laser deposition but is accelerated gradually by the laser-produced pressure.

The average pressure is fixed by the implosion velocity required to bring the fuel to ignition temperature. The desired sequence of acceleration can be brought about by increasing the laser power monotonically from an initial low value which is set to give the desired level of initial shock. Calculations show that a linear rise with time is effective, increasing the yield by a factor of two or three. Thus, the laser flux should vary as $$\phi(t) = (1 + \alpha t)$$

$\phi_o$ = initial flux level $\alpha$ = constant

Values found to be effective for D-T implosion of a 1 millimeter D-T shell contained in a beryllium absorbing layer are $\phi_o = 1.5625 \times 10^{19}$ erg/steradian sec.

$\alpha = 0.04$

Other pulse forms may be used which will be equally effective or better, such as $$\phi(t) = \phi_o \exp \alpha t$$

The proper choice of the pulse form must be done by computer runs in which the form is varied to give maximum yield.

A number of calculations were carried out for what is called open systems, that is, capsules or fuel pellets as illustrated in FIG. 1 utilizing a spherical convergent laser flux and no channel confinement. The materials considered were beryllium on aluminum outer layers for laser absorption and blow-off pressure, inner layers of beryllium, aluminum, or nickel for fuel tamping, and a solid-density D-T shell of fuel. The best results were obtained at implosion velocities (determined at the time the fuel started to recompress at the center of the configuration) of 4.8 to $5.0 \times 10^7$ cm/sec. The fuel compressions were improved by using a "ramped" laser flux, that is, a flux rising linearly with time. This has the effect of decreasing the initial shock heating of the fuel. To confine the alpha-particles resulting from the D-T reaction sufficiently to cause rapid heating and ignition a fuel density greater than 60–100 gram/cm$^3$ was found to be necessary. Further optimization may be possible, but the present results are very satisfactory.

It is anticipated that a further increase in implosion efficiency and fuel burn-up of between 2 and 4 can be achieved, giving an overall energy multiplication of 66 to 132 and 50 to 75 percent fuel burn-up.

The following examples are computational results:

CASE I. Beryllium-DT

Configuration
  Outer radius of one millimeter
  Outer beryllium shell with 8.6 micron thickness
  Fuel shell of solid D-T (0.190 gm/cm$^3$) with 11.4 micron thickness
  Laser Flux: $\phi_o(0.1+0.04\tau)$
    $\phi_o = 1.5625 \times 10^{19}$ erg/steradian sec.
    $\tau$ = time in $10^{-10}$ seconds
Characteristics
  Average fuel and tamper velocity at collapse time: $5.0 \times 10^7$ cm/sec
  Collapse time: 4.470 nanoseconds
  Time of maximum burning rate: 4.590 nanoseconds
  Laser energy incident: 87.3 kilojoules
  Laser energy absorbed: 79.5 kilojoules
  Energy in implosion (inward moving material at collapse time): 8.7 kilojoules
Output
  Fusion yield: 2.66 megajoules
  Fractional fuel burn: 0.300
  Overall energy multiplication: 30.5
  Implosion energy multiplication: 305

CASE II. Beryllium-Nickel-DT

Configuration:
  Outer radius of one millimeter
  Outer shell of beryllium with 5.5 micron thickness
  Nickel shell with 0.6 micron thickness
  Fuel shell of solid DT with 10.6 micron thickness
  Laser flux: $\phi_o (0.1+0.035\tau)$
    $\phi_o = 1.5625 \times 10^{19}$ erg/steradian sec.
    $\tau$ = time in $10^{-10}$ seconds
Characteristics
  Average fuel and tamper velocity at collapse time: $4.6 \times 10^7$ cm/sec.
  Collapse time: 4.476 nanoseconds
  Time of maximum burning rate: 4.590 nanoseconds
  Laser energy incident: 76.9 kilojoules
  Laser energy absorbed: 72.3 kilojoules
  Energy in implosion (inward moving material at collapse time): 7.7 kilojoules
Output
  Fusion yield: 2.55 megajoules
  Fraction of fuel burned: 0.307
  Overall energy multiplication: 31.2
  Implosion energy multiplication: 312

In connection with computations made with respect to the so-called open geometry or the open systems, computations were made with respect to the use of a solid LiD-LiT shell. Successful results were obtained with this configuration but it is expected that further optimization will be required to minimize the energy multiplication. The ignition of LiD-LiT requires greater initial compressions and more energy density; the results obtained, as indicated below, show rapid fuel burn-up after ignition has been achieved.

CASE III. Aluminum-Nickel-LiDT

Configuration
  Outer radius of one millimeter
  Outer shell of Al with 5.28 micron thickness
  Nickel shell of density 4.5 gm/cm$^3$, 2.2 micron thickness
  Fuel shell of LiDT with 6 micron thickness
  Laser Flux:
    $\phi_O (0.017+0.031\tau)$ if $\tau \leq 20$
    $\phi_O (-1.363+0.1\tau)$ if $\tau > 20$
    $\phi_O = 9.375 \times 10^{19}$ erg/steradian sec.
    $\tau$ = time in $10^{-10}$ sec.
Characteristics
  Average fuel and Ni velocity at collapse time: $7.3 \times 10^7$ cm/sec.
  Collapse time: 4.046 nanoseconds
  Time of maximum burning rate: 4.1275 nanoseconds
  Laser energy incident: 347 kilojoules
  Laser energy absorbed: 315 kilojoules
  Energy in implosion (inward moving material at collapse time): 34 kilojoules
Output
  Fusion yield: 429 kilojoules
  Fraction of fuel burned: 0.081
  Overall energy multiplication: 1.23
  Implosion energy multiplication: 12.6

CASE IV. Aluminum-Uranium-LiDT

Configuration
  Outer radius of one millimeter
  Outer shell of Al with 7.0 micron thickness
  Uranium shell of 0.65 micron thickness
  Fuel shell of LiDT with 8.9 micron thickness
  Laser Flux:
    $\phi_O (0.017+0.031\tau)$ if $\tau \leq 25$
    $\phi_O (-1.708+0.1\tau)$ if $\tau > 25$
    $\phi_O = 14.0625 \times 10^{19}$ erg/steradian sec.
    $\tau$ = time in $10^{-10}$ sec.
Characteristics
  Average fuel and tamper velocity of collapse time: $5.7 \times 10^7$ cm/sec.
  Collapse time: 4.177 nanoseconds
  Time of maximum burning rate: 4.345 nanoseconds
  Laser energy incident: 588 kilojoules
  Laser energy absorbed: 513 kilojoules
  Energy in implosion (inward moving material at collapse time): 52 kilojoules
Output
  Fusion yield: 1.235 megajoules
  Fraction of fuel burned: 0.158
  Overall fusion energy multiplication: 2.1
  Implosion energy multiplication: 23.7
  Fission yield: 164 kilojoules
  Overall energy multiplication: 2.38

STABILITY IN FUSION

This portion of the description relates particularly to the establishment of procedures wherein a high degree of stability and a dependable fusion performance is obtainable in the design and construction of capsules particularly useful for laser implosion.

In the above detailed description, various fuel configurations are disclosed together with materials and computational, and design details, the triggering energy to be obtained initially by suitably focused laser energy. In some cases the laser energy is distributed around fuel capsules through reflective devices; in other embodiments, the laser energy can be channeled by thermal conditions around a fuel capsule allowing substantially symmetric distribution of laser energy to effect implosion. This thermal conduction or channeling is fully disclosed in my copending application Ser. No. 371,385, filed June 21, 1973, which is a continuation-in-part application of Ser. No. 12,625, filed Feb. 20, 1970. The effect of high density tamping can also be utilized as fully described in my copending application Ser. No. 337,094, filed Mar. 2, 1973, which is a continuation-in-part application of Ser. No. 12,624 filed Feb. 20, 1970.

It will be appreciated that the most efficient and dependable system will require the achievement of a high degree of symmetry in the distribution of the implosion energy in order to provide good convergence and high compression in the thermonuclear fuel. To recapitulate, the acceleration of the capsule shell to produce the final implosion velocity required for compression and ignition of the thermonuclear fuel is extremely high. For typical conditions, as described above, with a millimeter capsule radius and a final velocity of $4.5 \times 10^7$ cm/sec, the average acceleration is $10^{16}$ cm/sec$^2$. The acceleration is due to a hot plasma layer accelerating a denser layer of lower temperature. Under these conditions two well known instabilities can occur:

(1) Rayleigh-Taylor instability, i.e., the overturning in an acceleration field of a layer supported by a layer of lower density.
(2) Formation of Bernard cells, i.e., the formation of thermal convection cells in a layer heated from below in an acceleration field, leading to overturning of the hot and cold layers.

The Rayleigh-Taylor instability can be readily visualized as the difficulties in supporting a heavy liquid against gravitational forces by a gaseous material under pressure. If the supported material has a high viscosity, and thus, resistance to rapid change in configuration, there is less likelihood of it starting to drop into the supporting gas. Accordingly, the viscosity of the material is a significant factor. The effect is most pronounced at a high rate of change so that the time scale of the process is also important. With materials which are forming the plasma in a fusion process, the temperature increase produces an increase in viscosity and this viscosity is also affected by the nature of the material. Beryllium, lithium, and aluminum, for example, with light atmos produce a higher viscosity at high temperatures. Size is also significant since the larger the system, the less is the effect of viscosity for a given configuration change.

The Bénard cell phenomena can be illustrated by visualizing the effect of heating a body of fluid from one boundary, for example, the lower boundary. If the heating takes place rapidly, the fluid rising by convection will move into and through the cooler areas to cause a maximum disturbance. The factors here will be viscosity, time, and conductivity. The viscosity of the fluid will slow down the disturbance and the relative conductivity will govern whether the heat from the rising portions of the liquid can be dissipated in the remaining volume to essentially neutralize the disturbance. With the materials under consideration in the fusion process, as has been pointed out, the viscosity increases with the temperature and inherently the conductivity also increases.

The problem of stability of an accelerated layer of fluid heated from below has been considered in detail by many authors, as summarized by Chandrasekhar-Hydrodynamic and Hydromagnetic Stability (Clarendon Press, 1961). Their treatment has been with a number of approximations which are justified by semi-quantitative arguments. We are interested in a more general problem in which temperature and density gradients are large and in which the coefficient of viscosity and thermal conduction are strong functions of the temperature. We are further interested in analysis which includes the phenomena of convective overturning and of instability or overturning due to a density gradient. The following analysis gives the exact linearized theory and discusses numerical methods suitable for obtaining solutions. The case considered is, however, somewhat simplified from the full problem since the unperturbed conditions are assumed to have no divergence of the heat flux and to have uniform acceleration. The more general problem is best solved, as stated below, by a numerical solution using a two-dimensional code, of the coupled equations of hydrodynamics, heat conduction, and energy transport.

In the following analysis, we use the notations
p = pressure
$\rho$ = density
g = acceleration
$v_i$ = ith component of velocity
$\nabla_i = \delta/\delta x_i$ = ith component of gradient
$\mu$ = viscosity
K = thermal conductivity
T = temperature
$\epsilon = (3/2)(kT/m)$ = energy per unit mass
$\kappa = (2/3)(m/k)K$ = thermal diffusiveness The equations governing the motion of the fluid are $$\rho \frac{dv_i}{dt} = -\nabla_i p - \rho g \delta_{i3} + \qquad (1)$$

$$\frac{\partial}{\partial x_j}\left[\left(\frac{\partial v_i}{\partial x_j} + \frac{\partial v_j}{\partial x_i}\right) - \tfrac{2}{3}\mu\delta_{ij}\,\text{div}\,\vec{v}\right]$$

$$\text{div}\,\rho v + \frac{\partial \rho}{\partial t} = 0$$

$$\frac{d\epsilon}{dt} = \frac{p}{\rho^2}\frac{d\rho}{dt} + \frac{1}{\rho}\vec{\nabla}\cdot\vec{K}\vec{\nabla}T +$$

(second-order term in viscous dissipation)

We assume that in the unperturbed problem $v=0$ and all other quantities are stationary and depend only on z. The unperturbed problem then satisfies $$\frac{dp}{dz} = -\rho g \qquad (2)$$

$$\frac{d}{dz}K\frac{dT}{dz} = 0$$

In linearizing Equation (1), we make use of the fact that $\epsilon = 3kT/zm$ $p = k\rho T/m$ and since the thermal conductivity for a high temperature plasma is a function only of temperature, $K = \sigma T^{5/2}$.

$$\vec{\nabla}\cdot\vec{K}\vec{\nabla}T = \frac{2}{7}\sigma\nabla^2 T^{7/2} \qquad (3)$$

The linearized equations in (1) then are $$\rho\frac{\partial v_i}{\partial t} = -\nabla_i p_1 - \rho_1 g \delta_{i3} + \qquad (4)$$

-continued
$$\frac{\partial}{\partial x_j}\left[\mu\left(\frac{\partial v_i}{\partial x_j}+\frac{\partial v_j}{\partial x_i}\right)-\tfrac{2}{3}\mu\delta_{ij}\,\text{div}\,v\right]$$

$$\rho\,\text{div}\,v + v\cdot\nabla\rho + \frac{\partial\rho_1}{\partial t} = 0$$

$$\frac{\partial T_1}{\partial t} + v\cdot\nabla T = -\tfrac{2}{3}T\,\text{div}\,v + \frac{1}{\rho}\nabla^2\kappa\rho T_1$$

In Equation (3), the unperturbed quantities are $\rho$, $\mu$, T, $\kappa$ and the first order perturbed quantities v, $\rho_1$, $T_1$, $p_1$. We now assume that the perturbed quantities depend on t and a transverse dimension x as $$f_1(x,z,t) = f_1(z)\exp(nt + ikx) \qquad (5)$$

We also let $d/dz = D$ and $v_z = W$. Equations (4) then become $$\rho n v_x = -ikp_1 - 2k^2\mu v_x + D(\mu Dv_x + ik\mu W) - \tfrac{2}{3}ik\mu\,\text{div}\,v$$

$$\rho n W = -Dp_1 - \rho_1 g - 2D\mu DW + \mu(-k^2 W + ikDv_x) - \tfrac{2}{3}D\mu\,\text{div}\,v$$

$$\rho\,\text{div}\,v + WD\rho + n\rho_1 = 0 \qquad (6)$$

$$\text{div}\,v = DW + ikv_x$$

$$nT_1 + WDT = \tfrac{2}{3}T\,\text{div}\,v + (1/\rho)\nabla^2\kappa\rho T_1$$

The first equation of (6), multiplying through by ik and using the equation for div v to eliminate $ikv_x$, may be rewritten $$-(\rho n - D\mu D + 2k^2\mu)\left(\frac{1}{\rho}D\rho W + \frac{n\rho_1}{\rho}\right) = \qquad (7)$$

$$k^2 p_1 - k^2 D\mu W - \tfrac{2}{3}k^2\frac{\mu}{\rho}(WD\rho + n\rho_1)$$

The second equation in (6) gives $$\rho n W = -Dp_1 - \rho_1 g + 2D\mu\left(DW + \frac{1}{3\rho}WD\rho + \frac{n\rho_1}{3\rho}\right) - \qquad (8)$$

$$k^2\mu W - \mu D\frac{1}{\rho}(DW\rho + n\rho_1)$$

The last equation in (6) gives $$nT_1 + WDT = \tfrac{2}{3}(T/\rho)(WD\rho + n\rho_1) + (1/\rho)\nabla^2\kappa\rho T_1 \qquad (9)$$

The perturbed pressure is related to $\rho_1$ and $T_1$ by $$p_1 = (1/m)(\rho T_1 \rho_1 T) \qquad (10)$$

Equation (10) allows $\rho_1$ to be eliminated from Equations (7), (8), and (9) which then relate $p_1$, $T_1$, and W.

A simplification of interest is for the case of marginal stability with $n=0$. In this case Equations (8), (9), and (10) reduce to $$(D\mu D - 2k^2\mu)\frac{1}{\rho}D\rho W = k^2 p_1 - k^2 D\mu W - \tfrac{2}{3}k^2\frac{\mu}{\rho}WD\rho \qquad (8')$$

$$0 = -Dp_1 - g\left(\frac{mp_1}{T} - \rho\frac{T_1}{T}\right) + \qquad (9')$$

$$2D\mu\left(DW + \frac{1}{3\rho}WD\rho\right) - k^2\mu W - \mu D\frac{1}{\rho}DW\rho$$

$$WDT = \tfrac{2}{3}T\frac{W}{\rho}D\rho + \frac{1}{\rho}D^2\kappa\rho T_1 - k^2\kappa T_1 \qquad (10')$$

In Equation (10'), the terms in $p_1$ appear in the combination $$\left(D + \frac{gm}{T}\right)p_1 \qquad (11)$$

Since, from Equation (2)

$$gm/T = -D\rho T/\rho T \qquad (12)$$

Equation (11) may be written $$\left[D - \frac{1}{\rho T}D(\rho T)\right]\cdot p_1 = \rho T D\frac{p_1}{\rho T} \qquad (13)$$

Using this result and rearranging Equations (8'), (9'), and (10'), we find $$p_1 = \frac{1}{k^2}(D\mu D - k^2\mu)\frac{1}{\rho}D\rho W + W(\rho^{\frac{2}{3}}D\mu\rho^{-\frac{2}{3}}) \qquad (14)$$

$$-gT_1 = -T^2 D\frac{1}{\rho T}p_1 + \qquad (15)$$

$$\frac{T}{\rho}\left(\frac{1}{\mu}D\mu^2 DW - \mu k^2 W - \tfrac{1}{3}\mu^3 D\frac{W}{\mu^2\rho}D\rho\right)$$

$$W(\rho^{\frac{2}{3}}DT\rho^{-\frac{2}{3}}) = \frac{1}{\rho}D^2\rho\kappa T_1 - k^2\kappa T_1 \qquad (16)$$

These equations may be easily combined to give a single equation for W. If the derivatives of $\rho$, T, $\mu$, and $\kappa$ are dropped in Equations (14), (15), and on the right-hand side of (16), the equations simplify to $$p_1 = (\mu/k^2)D(D^2 - k^2)W$$

$$-gT_1 = -(TD/\rho)p_1 + (T\mu/\rho)(D^2 - k^2)W \qquad (17)$$

$$W(\rho^{\frac{2}{3}}DT\rho^{-\frac{2}{3}}) = \kappa(D^2 - k^2)T_1$$

which combine to give $$(D^2 - k^2)^3 W = \frac{g\rho^{5/3}D(T\rho^{-2/3})k^2 W}{\kappa\mu T} \qquad (18)$$

Equation (18) is the usual result for convective instability if $\rho$ is assumed to be constant.

The boundary conditions follow from Equation (17) if the gradients may be assumed to vanish at the boundaries in the general case. If $T_1$, W, and $Dp_1$ vanish at the boundaries, the conditions are:

$$W_s = 0$$

$$D^2 W_s = 0 \qquad (19)$$

$$D^4 W_s = 0$$

A more interesting case is for free boundaries with no heat flux and no pressure, so that $DW=0$, $DT_1=0$, $p_1=0$. In this case Equation (17) gives $$DW_s = 0$$

$$D^3 W_s = 0 \quad (20)$$

$$D^5 W_s = 0$$

A case of maximum constraint is with rigid boundaries at which the tangential velocity is zero so that $Dp_1 = W_s = DW_s = 0$. The conditions then depend on the boundary condition on the temperature. The result is:

$$\left. \begin{array}{l} W_s = 0 \\ DW_s = 0 \\ D^2 W_s = 0 \end{array} \right\} T_1 = 0 \quad (21)$$

$$\left. \begin{array}{l} W_s = 0 \\ DW_s = 0 \\ D(D^2 - k^2)^2 W_s = 0 \end{array} \right\} DT_1 = 0 \quad (22)$$

To solve Equations (14), (15), and (16), it is convenient to rewrite them in a form suitable for numerical differencing. The equations may be rewritten $$P_1 = (\mu/k^2)s + F_1 r + F_2 q + F_3 W$$

$$-gT_1 = (-T/\rho)x - p_1 F_4 + F_5 r + F_6 q + F_7 W \quad (23)$$

$$W = F_8 v + F_9 u - F_{10} T_1$$

with $$q = DW \quad (25)$$

$$r = D^2 W = Dq$$

$$s = D^3 W = Dp$$

$$u = DT_1$$

$$v = Du = D^2 T_1$$

$$x = Dp_1$$

$$F_1 = \frac{1}{k^2} \left( D\mu + \mu \frac{D\rho}{\rho} \right)$$

$$F_2 = \frac{1}{k^2} \left( D\mu \frac{1}{\rho} D\rho + \mu D \frac{1}{\rho} D\rho \right) - \mu$$

$$F_3 = \frac{1}{k^2} D\mu D \frac{1}{\rho} D\rho - \frac{\mu}{\rho} D\rho + \rho^{\frac{1}{2}} D(\mu \rho^{-\frac{1}{2}})$$

$$F_4 = T^2 D \frac{1}{\rho T}$$

$$F_5 = \frac{T\mu}{\rho}$$

$$F_6 = \frac{2T}{\rho} D\mu - \frac{1}{3} \frac{T\mu}{\rho^2} D\rho$$

$$F_7 = \frac{-T\mu^3}{3\rho} D \frac{1}{\mu^2 \rho} D\rho - k^2 \frac{T\mu}{\rho}$$

$$F_8 = \frac{\kappa}{\rho^{\frac{3}{2}}(DT\rho^{-\frac{3}{2}})}$$

$$F_9 = \frac{1}{\rho^{\frac{3}{2}}(DT\rho^{-\frac{3}{2}})} \frac{2}{\rho} D\kappa\rho$$

$$F_{10} = \frac{k^2 \kappa - (1/\rho)D^2 \kappa \rho}{\rho^{\frac{3}{2}}(DT\rho^{-\frac{3}{2}})}$$

Equations (23) give at each point a connection between s, v, and x and the quantities W, q, r, $T_1$, u, $p_1$ which are of lower order. These are in turn obtained from the implicit set of centered difference equations $$W_{n+1} - W_n = \tfrac{1}{2}\Delta(q_n + q_{n+1})$$

$$g_{n+1} - g_n = \tfrac{1}{2}\Delta(r_n + r_{n+1})$$

$$r_{n+1} - r_n = \tfrac{1}{2}\Delta(s_n + s_{n+1})$$

$$(T_1)_{n+1} - (T_1)_n = \tfrac{1}{2}\Delta(u_n + u_{n+1}) \quad (26)$$

$$u_{n+1} - u_n = \tfrac{1}{2}\Delta(v_n + v_{n+1})$$

$$(p_1)_{n+1} - (p_1)_n = \tfrac{1}{2}\Delta(x_n + x_{n+1})$$

with $\Delta$ the mesh interval in the z-integration. The boundary conditions at $n=1$ corresponding to Equation (22) are $$W_1 = 0 = p_1 = u_1 = 0 \quad (27)$$

$q_1 = 1$ (normalization condition)
leaving the two parameters $r_1$ and $T_1$ to be determined together with the Reynolds number R so that the boundary conditions on W, p, u are satisfied at the second boundary.

Consideration of the above principles can result in a much greater refinement in the design of fusion capsules and imploding systems and will avoid the necessity of overdesign which might be necessary in an attempt to avoid the destructive and degenerative effects of Rayleigh-Taylor effect and the Bénard cell effect.

It will be appreciated that in a theoretically perfect implosion with absolute symmetry in energy input, perfect shell thicknesses and shapes, and uniform densities in materials, the above described effects can be virtually eliminated. It is to avoid the necessity for complying with these essentially unobtainable objectives in design that the following principles will be applied to permit the making of fusion capsules in a practical and economically feasible manner.

To facilitate the understanding of the following equations, the various symbols used are listed below.
  y = amplitude
  $y_0$ = initial amplitude
  n = growth rate of disturbance
  a = acceleration
  k = wave number of instability
  $\rho_1$ = density of light material
  $\rho_2$ = density of heavy material
  $\nu$ = kinematic viscosity
  $T_i$ = ion temperature
  $T_e$ = electron temperature $T_{kev}$ = Kilo-electron volts
$\ln\Lambda$ = natural log of ratio of screening distances
$m_i$ = ion mass
$m_e$ = electron mass
$z$ = atomic number
$e$ = electron charge
$A$ = Mass Number
$n_i$ = ion number density
$n_e$ = $zn_i$-electron number density
$t$ = time
$r_o$ = radius of fusion capsule
$v$ = implosion velocity
$d$ = layer depth
$\kappa$ = thermal diffusivity
$\epsilon\delta_t = 0.4z/(z+4)$
$R_{crit}$ = Critical Reynolds Number
(All quantities are in c.g.s. units unless otherwise indicated.)

Although the laser-driven implosion is characterized in the designs described earlier in the above disclosure by large temperature differences, some configurations can be considered in which the thermal conductivity of an accelerated material is low and the principal instability is due to large density differences in the accelerated material. In this case, if significant thermal gradients and thermal conduction can be neglected, the Rayleigh-Taylor instability dominates. In the absence of viscosity, the growth of an initial disturbance with amplitude $y_0$ is given by $$y = y_0 \exp nt \quad (28)$$

$$n = \left[ ak\left(\frac{\rho_2 - \rho_1}{\rho_2 + \rho_1}\right) \right]^{\frac{1}{2}}$$

If $\rho_2 >> \rho_1$ and the acceleration is $10^{16}$ cm$^2$/sec $$n = 10^{10}[k(\text{microns}^{-1})]^{\frac{1}{2}}/\text{sec} \quad (29)$$

Thus, in an implosion time of $3 \times 10^{-9}$ seconds, growth exceeding a few e-foldings would occur for wave numbers greater than 1/100 microns$^{-1}$.

The growth predicted by Equation (28) is reduced by the viscosity of the plasma layer. The maximum growth occurs at $$k(n_{max}) \approx \tfrac{1}{2}(a/\nu^2)^{\frac{1}{3}}$$

$$n_{max} \approx \tfrac{1}{2}(a^2/\nu)^{\frac{1}{3}} \quad (30)$$

$\nu$ = kinematic viscosity

Equation (30) holds if $k(n_{max})$ is greater than the reciprocal of the depth of the dense layer being accelerated. The growth rate is reduced to $10^9$/sec, giving 3 e-foldings in the implosion time of $3 \times 10^{-9}$ seconds, if the viscosity is sufficiently high, the condition being $$\nu > 1.25 \times 10^4 \text{ cm}^2/\text{sec} \quad (31)$$

The viscosity for a high temperature plasma is $$\nu = \frac{0.406(kT_i)^{5/2}}{z^4 e^4 \ln\Lambda n_i (m_i)^{1/2}} \quad (32)$$

For the temperature and density of interest, $\ln\Lambda \approx 5$, giving $$\nu = 1.13 \times 10^{26} \frac{T_{kev}^{5/2}}{z^3 A^{1/2} n_e} \quad (33)$$

with $n_e = zn_i$ and $A$ the mass number. Equation (31) then gives the condition $$\frac{T_{kev}^{5/2}}{z^3 A^{1/2}} > 1.10 \times 10^{-22} n_e \quad (34)$$

The electron density in the low density plasma is about the critical density (for 1 micron laser radiation = $10^{21}$/cm$^3$), giving $$\frac{T_{kev}^{5/2}}{z^3 A^{1/2}} > 0.110 \quad (35)$$

For various materials, this gives the condition for viscous stabilization $$T_{kev} > 0.63, \text{ DT} \quad (36)$$
$$> 2.28, \text{ Li}^7$$
$$> 3.39, \text{ Be}^9$$
$$> 11.2, \text{ Al}^{27}$$

The operating temperatures used in the fusion capsules described herein were in the range of 1 to 5 kev, giving adequate stabilization for DT, Li$^7$, Be$^9$ but not for aluminum.

The stabilization condition for fixed fuel implosion velocity $v$ scales with capsule radius $r_0$ as $$nt \approx \tfrac{1}{2}(vr_0/\nu)^{\frac{1}{2}} \quad (36a)$$

so that for stabilization of a capsule with radius $r_0$, the viscosity must satisfy the condition $$\frac{T_{kev}^{5/2}(r_0)}{z^3 A^{1/2}} > 1.10 r_0 \quad (37)$$

Thus, a centimeter capsule requires an increase in temperature by a factor $(10)^{2/5} = 2.51$.

In addition to the effect of viscosity on the Rayleigh-Taylor growth, the presence of large temperature differences and very high thermal conductivity strongly affects the growth rate. Under these conditions, the overturning of the layers of increasing density is accompanied by the development of large temperature differences which are suppressed by the high thermal conductivity. Convective overturning does not occur until a critical Reynolds number is reached. The condition for stability is $$\frac{a \, 1/T \, |dT/dz| d^4}{\kappa \nu} < R_{crit} \quad (38)$$

with the critical Reynolds number $R_{crit}$ in the range of 657 to 1,708, depending on the boundary condition. In Equation (38), $d$ is the layer depth and $\kappa$ the thermal diffusivity. The thermal diffusivity $\kappa$ is $$\kappa_e = \frac{6.93(kT_e)^{5/2}\epsilon\delta_t}{m_e^{1/2}e^4zn_e\ln\Lambda} \tag{39}$$

The coefficient $\epsilon\delta_t$ is approximately $0.4\, z/(z+4)$. The stability condition of Equation (38), using Equation (32) and Equation (39), becomes $$a\frac{d^4}{T}\left|\frac{dT}{dz}\right| < \frac{1.56\times 10^{55}}{n_e^2} \frac{[T_e(kev)T_i(kev)]^{5/2}}{A_i^{\frac{1}{2}}z^4(4+z)} R_{crit} \tag{40}$$

We assume $(1/T)|dT/dz| \approx 1/d$, $R_{crit} = 10^3$, $a = v^2/2r_0 = 10^{15}/r_0$ cm$^2$/sec$^2$. Equation (40) then gives the stabilization condition $$[T_e(kev)T_i(kev)]^{5/2} > \left[\frac{6.40\times 10^{-41}n_e^2}{r_0}d^3 A_i^{\frac{1}{2}}z^4(4+z)\right] \tag{41}$$

The region of steep thermal gradient is at $n_e \approx 10^{22}$. Equation (41) then gives the condition $$[T_e(kev)T_i(kev)]^{\frac{1}{2}} > 1.42\left(\frac{d^3}{r_0}\right)^{1/5}, DT \tag{42}$$

$$> 4.33\left(\frac{d^3}{r_0}\right)^{1/5}, Li^7$$

$$> 20.9\left(\frac{d^3}{r_0}\right)^{1/5}, Be^9$$

$$> 110\left(\frac{d^3}{r_0}\right)^{1/5}, Al^{27}$$

Thus, for a 20 micron layer and $r_0$ of 1 millimeter, the condition is $$[T_e(kev)T_i(kev)]^{1/2} > 0.124, DT \tag{43}$$

$$> 0.38, Li^7$$

$$> 1.83, Be^9$$

$$> 9.65, Al^{27}.$$

These conditions are satisfied for DT, Li$^7$, Be$^9$, but not for Al$^{27}$ (or higher Z materials). For larger capsules, if $d/r_0$ is kept constant, the temperature condition increases as $r_0^{1/70}$ or by a factor of 4.64 for a centimeter capsule with a 200 micron shell. The stabilization condition can still be met although with difficulty for Be$^9$ but more easily for Li$^7$.

The conditions for stabilization of the Rayleigh-Taylor instability or the thermal convective instability, as given by Equation (34) and Equation (41), depend strongly on the temperature and the atomic number of the material and less strongly on the size of the capsule. It is, however, apparent that capsules will be seriously unstable if (1) driving temperatures are too low, (2) the atomic number is too high, or (3) the capsule is too large. Thus, a high Z (gold, uranium, or tungsten) capsule will be unstable under achievable driving temperatures; an aluminum capsule with channel temperature in the range of 5 to 10 kev will be unstable if the radius is of the order of a centimeter; a beryllium capsule with a millimeter radius will be unstable if the driving temperature is under a few kilovolts. These considerations set essential design requirements on the fusion capsules. These results also suggest that a lithium hydride or beryllium shell driving an inner shell of uranium, tungsten, or gold surrounding the thermonuclear fuel may become unstable. In these designs, a careful consideration should be made of the shell uniformities, thickness, size, and position and accuracy. Also, if certain layers are very thin, the instability problems are not critical.

These design considerations may be given a more quantitative test by the use of a two-dimensional code containing the physics of the codes and methods of analysis discussed above in the computational and design details. Disturbances in shell radius or thickness can be introduced and the growth determined. The comutation will give an excellent guide to capsule design and laser operating conditions which will lead to the necessary implosion symmetry.

Reference has been made to controlling the laser flux with time to produce a series of pulses and an apparatus for achieving this pulse form is defined in a copending application of Carlton E. Thomas, entitled "Laser Waveform Generator," Ser. No. 371,882, filed June 21, 1973, now U.S. Pat. No. 3,879,109, issued Apr. 22, 1975. The disclosure of this application is incorporated herein by reference for the purpose of aiding those who are unskilled in the art of pulse forming in achieving this desired result.

Further reference is made to another application of Carlton E. Thomas on target illumination relating to an ellipsoidal reflection chamber for achieving uniform pellet exposure, this being an application entitled "Target Illumination," Ser. No. 365,092, filed May 21, 1973.

To recapitulate to some degree, the shell of fusion fuel has an outer radius in the range of 0.5 to 2 mm. with a shell thickness in the range of 5 to 30% of the outer radius. As has been previously indicated, the laser flux which is directed to the fuel pellet is increased with time to increase the driving pressure at the D-T surface, which produces further compression of the fuel shocked by the passage of the first exposure. As a consequence, the final compression at the center of convergence can be brought into the range of several hundred to a few thousand grams/cm$^3$. This small inner central igniting fuel region and the surrounding colder fuel sphere is highly compressed at a pressure, for example, of 500 grams/cm$^3$, and a temperature at 1 kev. The material surrounding the compressed fuel is the hot conduction zone at a much lower density. The detonation wave proceeds outwardly into the compressed fuel burning at 30–50 kev the maximum burning rate.

FIG. 8 gives the radius versus time history during implosion. The different types of motion typical of the laser driven implosion are schematically indicated in this figure, which shows the radius of different fronts as a function of time up to the point of maximum fuel compression and subsequent fuel ignition and burn. The "outer blow-off front" indicates the rapidly expanding low density plasma heated by the laser. The "critical density" line indicates the point of maximum penetration of the laser flux, where reflection occurs as the density passes the critical density. Between this point and the "thermal front" is the conduction zone through which energy transfer occurs by thermal conduction from the laser deposition region. The region ahead of the thermal front is controlled by shock hydrodyamics. The example shown gives three shocks driven by successive increases of the laser flux. Each successive shock front moves at higher velocity which results from the increase in pressure in the conduction zone. The three shocks arrive at the center of convergence simultaneously giving a maximum compression of the order of 1000 grams/cm$^3$. The fuel then ignites at the center of convergence and a supersonic detonation wave moves very rapidly through the compressed fuel, which then starts to expand at sonic velocity. The ignited and burning fuel continues to react and burn until the process is terminated by expansion.

FIG. 9 gives typical density and temperature profiles during implosion. The example given is for an implosion driven by three successively increasing levels of laser illumination which produces three shocks running into the center of convergence. The solid curve gives the density profile which increases steeply from the critical density at a radius of 500µ to the solid density of 0.19 grams/cm$^3$ at 400µ, to a peak density of nearly 40 grams/cm$^3$ at 330µ, and then drops through the preceding shocks to the unshocked original solid density at a radius of 50µ. The temperature profile is schematically indicated as a dashed curve, with the temperature falling from 2.5 kilovolts in the laser deposition region to approximately 200 volts at the head of the thermal wave which has penetrated to 360µ. The temperature profile at smaller radii is due entirely to shock heating and falls essentially to zero ahead of the first shock. The later development of the shock motion leads to a near simultaneous arrival of the three shocks at the center of convergence, with the density rising to approximately 1000 grams/cm$^3$. In this process typically 80 to 90 percent of the original D-T fuel is removed by penetration of the thermal wave and carried off at high temperature as rapidly expanding low density plasma.

One example given by a detailed hydrodynamic computation is as follows:

Laser pulse form:
  $6.3 \times 10^{11}$ watts from 0 to 5.47 nanoseconds
  $6.3 \times 10^{12}$ watts from 5.47 to 7.21 nanoseconds
  linear rise from $6.3 \times 10^{12}$ watts at
  7.21 nanoseconds to $4 \times 10^{14}$ watts at 7.42 nanoseconds
Laser energy absorbed:
  60.1 kilojoules
Central density peak (averaged over 10% of radius):
  1380 gm/cm$^3$
Fraction of sphere imploded to density greater than 100 gm/cm$^3$:
  12%
Time of central compression greater than 100 gm/cm$^3$:
  $1.8 \times 10^{-11}$ seconds
Energy input into compressed DT at time of maximum compression:
  2.9 kilojoules
Overall laser coupling efficiency into compressed DT:
  4.8%
Fusion energy deposited by α-particles:
  102 kilojoules
Total fusion yield:
  510 kilojoules
Fraction of D-T burned in the central region:
  49%
Fraction of compressed D-T burned:
  13%

I claim:
1. A method of achieving the release of thermonuclear energy which comprises:
   (a) preforming a minute closed hollow shell of solid fusion fuel material,
   (b) establishing a laser light source to produce a converging wave coherent light energy in phase in time,
   (c) directing a pulse of light energy from said source to said shell to create a surface heating and vaporization and an inwardly traveling shock wave to implode the shell to effect release of neutrons and a resultant thermonuclear condition, and
   (d) utilizing the kinetic energy of the expanding D-T plasma as a source of thermal energy.

2. A method of achieving the release of thermonuclear energy which comprises:
   (a) preforming a minute closed hollow shell of solid fusion fuel material,
   (b) establishing a laser light source to produce a converging wave coherent light energy in phase in time,
   (c) directing a pulse of light energy from said source to said shell to create a surface heating and vaporization and an inwardly traveling shock wave to implode the shell to effect release of neutrons and a resultant thermonuclear condition, and
   (d) utilizing the fast neutrons from said release of intense radiation to multiply in beryllium and absorb in lithium, to breed tritium.

3. A method of achieving the release of thermonuclear energy which comprises:
   (a) performing a minute closed hollow shell of solid fusion fuel material,
   (b) establishing a laser light source to produce a converging wave coherent light energy in phase in time,
   (c) directing a pulse of light energy from said source to said shell to create a surface heating and vaporization and an inwardly traveling shock wave to implode the shell to effect release of neutrons and a resultant thermonuclear condition, and
   (d) capturing the fast neutrons from said release of intense radiation to breed tritium by slowing the neutrons in beryllium to multiply the number of neutrons in the reaction, $n + Be^9 \rightarrow 2\alpha + 2n$, and then absorbing the neutrons in lithium by the reaction $n + Li^6 \rightarrow \alpha + t$.

4. A method of achieving the release of thermonuclear energy which comprises:
   (a) preforming a minute closed hollow shell of solid fusion fuel material,
   (b) establishing a laser light source to produce a converging wave coherent light energy in phase in time,
   (c) directing a pulse of light energy from said source to said shell to create a surface heating and vaporization and an inwardly traveling shock wave to implode the shell to effect release of neutrons and a resultant thermonuclear condition, and
   (d) capturing the fast neutrons from thermonuclear burn to breed plutonium.

5. A method of achieving a release of thermonuclear energy which comprises:
   (a) preforming a minute closed shell of solid fusion fuel material, (b) establishing a converging wave of a laser light source of coherent light energy in phase in time, and (c) directing a pulse of light energy from said source to said shell to effect surface heating and vaporization sufficient to drive intense heat and shock waves inwardly of said shell to cause an intense radiation reaction of the material in said shell to release neutrons and create a thermonuclear reaction in an energy of expansion substantially to the degree of $10^{13}$ ergs.

6. A method of achieving a release of thermonuclear energy which comprises:
   (a) preforming a minute, closed, hollow shell of predetermined configuration from a solid nuclear material,
   (b) establishing a laser light source of coherent light energy in phase in time to have a converging output wave with a configuration matched to the configuration of the shell, and
   (c) directing a pulse of light energy from said source in said configuration to said sphere to create a surface heating and vaporization and an inwardly traveling shock wave to implode the shell to effect release of neutrons and a resultant release of intense radiation in a thermonuclear reaction.

7. A method of achieving a release of thermonuclear energy which comprises:
   (a) preforming a minute, closed, hollow shell of predetermined configuration of deuterium-tritium as a solid core,
   (b) establishing a laser light source of coherent light energy in phase in time to have a converging output wave with a configuration matched to the configuration of the shell, and
   (c) directing a pulse of light energy from said source in said configuration to said sphere to create a surface heating and vaporization and an inwardly traveling shock wave to implode the shell to effect release of neutrons and a resultant release of intense radiation in a thermonuclear reaction.

8. A method of achieving a release of thermonuclear energy which comprises:
   (a) preforming a minute, closed, hollow shell of solid nuclear material in the range of 0.01 to 0.10 cm with a shell thickness in the range of 5 to 30% of the outer radius, and
   (b) illuminating the shell around its surface by a uniformly converging laser wave in the range of 10,000 to 100,000 joules to direct an evanescent wave into the shell causing ionization, rapid rise in surface pressure and resultant inward shock waves to implode the shell toward the sphere center, the resulting heat, electron-to-electron collisions and reaction effecting thermonuclear conditions and a release of energy to the degree of $1.95 \times 10^{13}$ erg.

9. A method of creating thermal energy which comprises:
   (a) locating in a reactor body a minute, closed, hollow shell of solid deuterium-tritium,
   (b) illuminating the shell around its surface with a uniformly converging laser wave to effect a thermonuclear burn in the reactor body,
   (c) establishing a flow of liquid adjacent the reactor body to absorb heat from said burn, and
   (d) directing the heating liquid to a heat exchanger wherein the heat may be productively utilized.

10. A method of achieving a release of thermonuclear energy which comprises:
    (a) preforming a minute, closed, hollow shell of solid nuclear material in the range of 0.01 to 0.10 cm with a shell thickness in the range of 5 to 30% of the outer radius,
    (b) illuminating the shell around its surface by a uniformly converging laser wave in the range of 10,000 to 100,000 joules to direct an evanescent wave into the shell causing ionization, rapid rise in surface pressure and resultant inward shock waves to implode the shell toward the sphere center, the resulting heat, electron-to-electron collisions and reaction effecting thermonuclear conditions, and a release of energy to the degree of $1.95 \times 10^{13}$ erg,
    (c) establishing a flow of iquid lithium adjacent the reactor body to absorb heat from said release of energy, and
    (d) directing the heated lithium to a heat exchanger wherein the heat may be productively utilized.

11. A method of achieving the release of thermonuclear energy which comprises:
    (a) preforming a minute hollow shape of solid fusion fuel material,
    (b) establishing a laser light source to produce a converging wave of coherent light having a flux distribution in time and space to match the minute shape,
    (c) directing a laser pulse of light energy from said source to said shape to create a surface heating and vaporization and an inwardly traveling shock wave to compress and implode the shape to effect release of neutrons and a resultant thermonuclear condition and reaction, and
    (d) shaping the laser pulse to create secondary shock waves arriving at the implosion center of said shape at the time of maximum compression.

12. A method of achieving the release of thermonuclear energy which comprises:
    (a) preforming a minute hollow shape of solid fusion fuel material,
    (b) establishing a laser light source to produce a converging wave of coherent light having a flux distribution in time and space to match the minute shape,
    (c) directing a laser pulse of light energy from said source to said shape to create a surface heating and vaporization and an inwardly traveling shock wave to compress and implode the shape to effect release of neutrons and a resultant thermonuclear condition and reaction, and
    (d) terminating the laser pulse at the time for which the resulting rarefaction wave reaches the center of said shape after energy production is terminated.

13. A method of achieving the relase of thermonuclear energy which comprises:
    (a) preforming a minute hollow shape of solid fusion fuel material,
    (b) utilizing a high Z contaminant selected from uranium, thorium, and radium with said solid material to serve as a thermal conduction barrier to prevent premature heating of the inner surface of the shape, and
    (c) directing a laser pulse of light energy from said source to said shape to create a surface heating and vaporization and an inwardly traveling shock wave to compress and implode the shape to effect release of neutrons and a resultant thermonuclear condition and reaction.

14. A method of achieving the release of thermonuclear energy which comprises:
(a) preforming a minute hollow shape having a core of solid deuterium-tritium, providing a shell of high density material around said core, and providing a surface of blow-off material selected from LiH and Be outside said shell to increase inertial tamping when subject to a laser impulse,
(b) establishing a laser light source to produce a converging wave of coherent light having a flux distribution in time and space to match the minute shape, and
(c) directing a laser pulse of light energy from said source to said shape to create a surface heating and vaporization and an inwardly traveling shock wave to compress and implode the shape to effect release of neutrons and a resultant thermonuclear condition and reaction.

15. A method of achieving the release of thermonuclear energy which comprises:
(a) preforming a spherical shell of deuterium-tritium as a solid material having a hollow center, providing a shell of high density material selected from a group including gold, tungsten, and uranium around said shell, providing a surface blow-off material around said high density material in the form of hydrogen or deuterium,
(b) establishing a laser light source to produce a converging wave of coherent light having a flux distribution in time and space to match the minute shape, an
(c) directing a predetermined laser flux pulse from said source to said shell to create surface heating and vaporization and an inwardly traveling shock wave to compress and implode the shape to effect release of neutrons and a resultant thermonuclear condition and reaction,
said shell of high density material under the surface blow-off layer serving to effect increased inertial tamping of the reacting deuterium-tritium center.

16. A method of achieving the release of thermonuclear energy which comprises:
(a) preforming a minute, spherical shell of solid deuterium-tritium, providing an outer zone of hydrogen around said shell,
(b) establishing a laser light source to produce a converging wave coherent light energy in phase in time, and
(c) directing a pulse of light energy from said source to said shell to create a surface heating and vaporization and an inwardly traveling shock wave to implode the shell to effect release of neutrons and a resultant thermonuclear condition.

17. A method of achieving the release of thermonuclear energy which comprises:
(a) preforming a minute, spherical shell of solid deuterium-tritium, providing an outer zone of deuterium around said shell,
(b) establishing a laser light source to produce a converging wave coherent light energy in phase in time, and
(c) directing a pulse of light energy from said source to said shell to create a surface heating and vaporization and an inwardly traveling shock wave to implode the shell to effect release of neutrons and a resultant thermonuclear condition.

18. A method of achieving the release of thermonuclear energy which comprises:
(a) preforming a hollow shell of equal parts of deuterium-tritiun in the range of 1 millimeter radius having a wall thickness of about 0.02 cm, providing a coating of hydrogen or deuterium on said shell,
(b) establishing a laser light source of coherent light energy in phase in time and capable of a pulse output of at least 10,000 joules, and
(c) directing a short pulse of light energy from said source to said shell to create a surface heating and vaporization and an inwardly traveling shock wave to implode the shell to effect release of deuterons and tritons and a resultant thermonuclear reaction.

19. A method of achieving the release of thermonuclear energy which comprises:
(a) preforming a hollow shell of equal parts of deuterium-tritium in the range of 1 millimeter radius having a wall thickness of about 0.02 cm, providing a coating of hydrogen or deuterium on said shell,
(b) establishing a laser light source of coherent light energy in phase in time and capable of a pulse output of at least 10,000 joules, and
(c) directing a heating pulse of light energy from said source in the range of one thousandth millionth of a second toward said shell to create a surface heating and vaporization layer of high pressure plasma and an inwardly traveling shock wave to implode the shell to effect release of deuterons and tritons and a resultant thermonuclear reaction.

20. A method of achieving the release of thermonuclear energy which comprises:
(a) preforming a minute hollow shape having a core of solid deuterium-tritium material, providing a shell of high density material selected from a group including gold, tungsten and uranium around said core, and providing a surface of blow-off material outside said shell to increase inertial tamping when subject to a laser impulse,
(b) establishing a laser light source to produce a converging wave of coherent light having a flux distribution in time and space to match the minute shape,
(c) directing a laser pulse of light energy from said source to said shape to create a surface heating and vaporization and an inwardly traveling shock wave to compress and implode the shape to effect release of neutrons and a resultant thermonuclear condition and reaction, and
(d) controlling said laser pulse wherein the flux level is increased with time to reduce initial shock heating of fuel and give maximum compression after implosion.

21. A method of achieving the release of thermonuclear energy which comprises:
(a) preforming a minute hollow shape having a core of solid deuterium-tritium material, providing a shell of high density material selected from a group including gold, tungsten and uranium around said core, and providing a surface of blow-off material outside said shell to increase inertial tamping when subject to a laser impulse,
(b) establishing a laser light source to produce a converging wave of coherent light having a flux distribution in time and space to match the minute shape,
(c) directing a laser pulse of light energy from said source to said shape to crease a surface heating and vaporization and an inwardly traveling shock wave to compress and implode the shape to effect release of neutrons and a resultant thermonuclear condition and reaction, and (d) controlling said laser pulse wherein the flux level is increased with time after the initiation thereof in the following relationship: $\phi(t)=\phi(1+d\alpha t)$ where $\phi$ is the initial flux level and $\alpha$ is a constant.

22. A method of achieving the release of thermonuclear energy which comprises:
(a) preforming a minute hollow shape having a core of solid deuterium-tritium material, providing a shell of high density material selected from a group including gold, tungsten and uranium around said core, and providing a surface of blow-off material outside said shell to increase inertial tamping when subject to a laser impulse,
(b) establishing a laser light source to produce a converging wave of coherent light having a flux distribution in time and space to match the minute shape,
(c) directing a laser pulse of light energy from said source to said shape to create a surface heating and vaporization and inwardly traveling shock wave to compress and implode the shape to effect release of neutrons and a resultant thermonuclear condition and reaction, and
(d) controlling said laser pulse wherein the flux level is increased with time after the initiation thereof in the following relationship: $\phi(t)=\phi_o \exp \alpha t$ where $\phi$ is the initial flux level and $\alpha$ is a constant.

23. A method of achieving the release of thermonuclear energy which comprises:
(a) preforming a minute closed hollow shell of solid deuterium-tritium material,
(b) establishing a laser light source to produce a converging wave coherent light energy in phase in time,
(c) directing a pulse of light energy from said source to said shell to create a surface heating and vaporization and an inwardly traveling shock wave to implode the shell to effect release of neutrons and a resultant thermonuclear condition, and
(d) selecting materials and operating conditions to minimize disturbances which limit the convergence of an implosion in accordance with the relationship $$[T_e(\text{kev})T_i(\text{kev})]^{5/2} > \left[ \frac{6.40 \times 10^{-41} n_e^2}{r_o} d^3 A_i^{\frac{1}{2}} z^4 (4 + z) \right]$$

where $T_e(\text{kev})$ is electron temperature, $T_i(\text{kev})$ is ion temperature, $n_e$ is electron density number, d is layer depth, A is atomic mass, and z is the atomic number of the material.

24. A method of achieving the release of thermonuclear energy which comprises:
(a) preforming a minute closed hollow shell of solid deuterium-tritium material,
(b) establishing a laser light source to produce a converging wave coherent light energy in phase in time,
(c) directing a heating pulse of light energy from said source in the range of one thousandth millionth of a second toward said shell to effect release of neutrons and resultant thermonuclear condition, and
(d) selecting materials and operating conditions to minimize disturbances which limit the convergence of an implosion in accordance with the relationship $$[T_e(\text{kev})T_i(\text{kev})]^{5/2} > \left[ \frac{6.40 \times 10^{-41} n_e^2}{r_o} d^3 A_i^{\frac{1}{2}} z^4 (4 + z) \right]$$

where $T_e(\text{kev})$ is electron temperature, $T_i(\text{kev})$ is ion temperature, $n_e$ is electron density number, d is layer depth, A is atomic mass, and z is the atomic number of the material.

25. A method of achieving the release of thermonuclear energy which comprises:
(a) preforming a minute closed hollow shell of solid deuterium-tritium material,
(b) establishing a laser light source of coherent light energy in phase in time capable of an energy output of 10,000 to 100,000 joules,
(c) directing a pulse of light energy from said source to said shell to create a surface heating and vaporization and an inwardly traveling shock wave to implode the shell to effect release of neutrons and a resultant thermonuclear condition, and
(d) selecting materials and operating conditions to minimize disturbances which limit the convergence of an implosion in accordance with the relationship $$[T_e(\text{kev})T_i(\text{kev})]^{5/2} > \left[ \frac{6.40 \times 10^{-41} n_e^2}{r_o} d^3 A_i^{\frac{1}{2}} z^4 (4 + z) \right]$$

where $T_e(\text{kev})$ is electron temperature, $T_i(\text{kev})$ is ion temperature, $n_e$ is electron density number, d is layer depth, A is atomic mass, and z is the atomic number of the material.

26. A method of achieving a release of thermonuclear energy which comprises:
(a) preforming a minute closed shell of solid nuclear fusion material,
(b) establishing a converging wave of a laser light source of coherent light energy in phase in time,
(c) directing a pulse of light energy from said source to said shell to effect surface heating and vaporization sufficient to drive intense heat and shock waves inwardly of said shell to cause an intense radiation reaction of the material in said shell to release neutrons and create a thermonuclear reaction in an energy of expansion substantially to the degree of $10^{13}$ ergs, and
(d) selecting materials and operating conditions to minimize disturbances which limit the convergence of an implosion in accordance with the relationship $$[T_e(\text{kev})T_i(\text{kev})]^{5/2} > \left[ \frac{6.40 \times 10^{-41} n_e^2}{r_o} d^3 A_i^{\frac{1}{2}} z^4 (4 + z) \right]$$

where $T_e(\text{kev})$ is electron temperature, $T_i(\text{kev})$ is ion temperature, $n_e$ is electron density number, d is layer depth, A is atomic mass, and z is the atomic number of the material.

27. A method of achieving a release of thermonuclear energy which comprises:

(a) preforming a minute, closed, hollow shell of predetermined configuration of deuterium-tritium as a solid core,
(b) establishing a laser light source of coherent light energy in phase in time to have a converging output wave with a configuration of the shell,
(c) directing a pulse of light energy from said source in said configuration to said sphere to create a surface heating and vaporization and an inwardly traveling shock wave to implode the shell to effect release of neutrons and a resultant release of intense radiation in a thermonuclear reaction, and
(d) selecting materials and operating conditions to minimize disturbances which limit the convergence of an implosion in accordance with the relationship $$[T_e(\text{kev})T_i(\text{kev})]^{5/2} > \left[ \frac{6.40 \times 10^{-41} n_e^2}{r_o} d^3 A_i^{\frac{1}{2}} z^4 (4 + z) \right]$$

where $T_e(\text{kev})$ is electron temperature, $T_i(\text{kev})$ is ion temperature, $n_e$ is electron density number, d is layer depth, A is atomic mass, and z is the atomic number of the material.

28. A method of achieving the release of thermonuclear energy which comprises:
(a) preforming a spherical shell of deuterium-tritium as a solid material having a hollow center, providing a shell of high density material selected from a group including gold, tungsten, and uranium around said shell, providing a surface blow-off material around said high density material in the form of hydrogen or deuterium,
(b) establishing a laser light source to produce a converging wave of coherent light having a flux distribution in time and space to match the minute shape,
(c) directing a high laser flux pulse from said source to said shell to create surface heating and vaporization and an inwardly traveling shock wave to compress and implode the shape to effect release of neutrons and a resultant thermonuclear condition and reaction,
said shell of high density material under the surface blow-off layer serving to effect increased inertial tamping of the reacting deuterium-tritium center, and
(d) selecting materials and operating conditions to minimize disturbances which limit the convergence of an implosion in accordance with the relationship $$[T_e(\text{kev})T_i(\text{kev})]^{5/2} > \left[ \frac{6.40 \times 10^{-41} n_e^2}{r_o} d^3 A_i^{\frac{1}{2}} z^4 (4 + z) \right]$$

where $T_e(\text{kev})$ is electron temperature, $T_i(\text{kev})$ is ion temperature, $n_e$ is electron density number, d is layer depth, A is atomic mass, and z is the atomic number of the material.

29. A method of achieving the release of thermonuclear energy which comprises:
(a) preforming a minute hollow shape of solid deuterium-tritium material, providing a shell of high density material around said minute hollow shape, and providing a surface of blow-off material outside said shell to increase tamping when subject to a laser impulse,
(b) establishing a laser light source to produce a converging wave of coherent light having a flux distribution in time and space to match the minute shape,
(c) directing a laser pulse of light energy from said source to said shape to create a surface heating and vaporization and an inwardly traveling shock wave to compress and implode the shape to effect release of neutrons and a resultant thermonuclear condition and reaction,
(d) controlling said laser pulse wherein the flux level is increased with time to reduce initial shock heating of fuel and give maximum compression after implosion, and
(e) selecting materials and operating conditions to minimize disturbances which limit the convergence of an implosion in accordance with the relationship $$[T_e(\text{kev})T_i(\text{kev})]^{5/2} > \left[ \frac{6.40 \times 10^{-41} n_e^2}{r_o} d^3 A_i^{\frac{1}{2}} z^4 (4 + z) \right]$$

where $T_e(\text{kev})$ is electron temperature, $T_i(\text{kev})$ is ion temperature, $n_e$ is electron density number, d is layer depth, A is atomic mass, and z is the atomic number of the material.

30. A method of obtaining the controlled release of fusion energy utilizing a laser flux directed to a minute hollow shape of fusion fuel characterized by the steps of:
(1) directing an initial flux to produce surface heating of the fuel and formation of an underdense deposition layer into which the laser coupling efficiency approaches unity, to effect thermal conduction by hot electrons from the laser deposition region into the higher density fuel to obtain a pressure increased over the pressure in the laser deposition region, and to produce a spherically convergent hydrodynamic implosion by the formation of a first strong convergent shock in the fuel,
(2) increasing and controlling the laser flux with time to produce further rise in pressure and compression of the fuel following the passage of the first shock, and to give simultaneous arrival time at the implosion center of the successive pressure shocks produced by the rising laser flux, and
(3) the laser flux intensity and flux increase with time being adjusted to bring the fuel to increased compression and to heat a portion of fuel at the center of convergence to ignition temperature, this ignition producing increased temperature as the small quantity of fuel approaches a maximum of thermonuclear reaction rate to effect a strong shock and transport of α-particle energy produced in the ignited fuel region to cause subsequent ignition of the highly compressed surrounding fuel, the subsequent burn-up of the total ignited fuel producing large energy multiplication over the input laser energy to compensate for the inefficiency of energy transfer from the laser into the highly compressed fuel.

31. A method as defined in claim 30 which includes adjusting the laser flux intensity and flux increase with time to bring the fuel to a high degree of compression in the range of a few hundred to a few thousand grams/cm$^3$, the small quantity of the fuel at the center of convergence being heated within a range of 5 Kev, the remainder of the compressed fuel having an average temperature of less than one Kev, the small quantity of ignited fuel reaching a temperature of 30–50 Kev when the thermonuclear reaction rate approaches a maximum to ignite the surrounding compressed, relatively cold fuel.

32. A method as defined in claim 31 in which the relationship of the laser pulse form to time is in the range of:

$6.3 \times 10^{11}$ watts from 0 to 5.45 nanoseconds $6.3 \times 10^{12}$ watts from 5.45 to 7.21 nanoseconds a linear rise from $6.3 \times 10^{12}$ watts to $4 \times 10^{14}$ watts at 7.42 nanoseconds producing a laser energy absorption of 60.1 kilojoules and a total fusion yield of about 510 kilojoules.

33. A method as defined in claim 30 in which the fuel comprises a shell of fusion fuel with an outer radius in the range of 0.5 to 2 mm. with a shell thickness in the range of 5 to 30% of the outer radius.

34. A method as defined in claim 33 in which the shell is formed of deuterium-tritium at solid density with an outside layer of material selected from the group consisting of deuterium and hydrogen.

35. A method of obtaining the controlled release of fusion energy utilizing a laser flux directed to a minute quantity of fusion fuel characterized by the steps of:
 (1) selecting a laser of a predetermined energy range output in kilojoules,
 (2) selecting a quantity of fusion fuel in the shape of a shell to be exposed to said laser, the quantity and radial thickness of the shell being determined in relation to the laser energy range output and pulse form capabilities,
 (3) directing an initial flux to produce surface heating of the fuel and formation of an underdense deposition layer into which the laser coupling efficiency approaches unity, to effect rapid thermal conduction by hot electrons from the laser deposition region into the higher density fuel to obtain a pressure increased over the pressure in the laser deposition region, and to produce a spherically convergent hydrodynamic implosion by the formation of a first strong convergent shock in the fuel,
 (4) increasing and controlling the laser flux with time to produce further rise in pressure and compression of the fuel following the passage of the first shock, and to give simultaneous arrival time at the implosion center of the successive pressure shocks produced by the rising laser flux, and
 (5) the laser flux intensity and flux increase with time being adjusted to bring the fuel to increased compression and to heat a portion of fuel at the center of convergence to ignition temperature, this ignition producing a greatly increased temperature as the small quantity of fuel approaches a maximum of thermonuclear reaction rate to effect a strong shock and transport of $\alpha$-particle energy produced in the ignited fuel region to cause subsequent ignition of the highly compressed surrounding fuel, the subsequent burn-up of the total ignited fuel producing large energy multiplication over the input laser energy to compensate for the inefficiency of energy transfer from the laser into the highly compressed fuel.

36. A method as defined in claim 35 in which the shell has an outer radius in the range of 0.5 to 2 mm. with a shell thickness in the range of 5 to 30% of the outer radius.

37. A method of obtaining the controlled release of fusion energy utilizing a laser flux directed to a minute quantity of fusion fuel characterized by the steps of:
 (1) selecting a laser of a predetermined energy range output in kilojoules,
 (2) selecting a quantity of fusion fuel in the shape of a sphere to be exposed to said laser, the quantity of fuel in the hollow sphere being determined in relation to the laser energy range output and pulse form capabilities,
 (3) directing an initial flux to produce surface heating of the fuel and formation of an underdense deposition layer into which the laser coupling efficiency approaches unity, to effect thermal conduction by hot electrons from the laser deposition region into the higher density fuel to obtain a pressure increased over the pressure in the laser deposition region, and to produce a spherically convergent hydrodynamic implosion by the formation of a first strong convergent shock in the fuel,
 (4) increasing and controlling the laser flux with time to produce further rise in pressure and compression of the fuel following the passage of the first shock, and to give simultaneous arrival time at the implosion center of the successive pressure shocks produced by the rising laser flux, and
 (5) the laser flux intensity and flux increase with time being adjusted to bring the fuel to increased compression and to heat a portion of fuel at the center of convergence to ignition temperature, this ignition producing a greatly increased temperature as the small quantity of fuel approaches a maximum of thermonuclear reaction rate to effect a strong shock and transport of $\alpha$-particle energy produced in the ignited fuel region to cause subsequent ignition of the highly compressed surrounding fuel, the subsequent burn-up of the total ignited fuel producing large energy multiplication over the input laser energy to compensate for the inefficiency of energy transfer from the laser into the highly compressed fuel.

* * * * *